United States Patent
Koike et al.

(10) Patent No.: US 12,018,622 B2
(45) Date of Patent: Jun. 25, 2024

(54) CONTROLLER DEVICE FOR VARIABLE VALVE TIMING APPARATUS

(71) Applicant: Hitachi Astemo, Ltd., Hitachinaka (JP)

(72) Inventors: Yuta Koike, Hitachinaka (JP); Masayuki Saruwatari, Hitachinaka (JP); Yuusuke Kihara, Tokyo (JP); Akihiro Komori, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/011,977

(22) PCT Filed: Jun. 23, 2021

(86) PCT No.: PCT/JP2021/023772
§ 371 (c)(1),
(2) Date: Dec. 21, 2022

(87) PCT Pub. No.: WO2022/049869
PCT Pub. Date: Mar. 10, 2022

(65) Prior Publication Data
US 2023/0250767 A1 Aug. 10, 2023

(30) Foreign Application Priority Data
Sep. 2, 2020 (JP) .................................. 2020-147837

(51) Int. Cl.
*F02D 13/02* (2006.01)
*F01L 1/352* (2006.01)
(Continued)

(52) U.S. Cl.
CPC .......... *F02D 13/0238* (2013.01); *F01L 1/352* (2013.01); *F01L 1/356* (2013.01);
(Continued)

(58) Field of Classification Search
CPC .. F02D 13/02; F02D 13/0223; F02D 13/0234; F02D 13/0238; F02D 13/08;
(Continued)

(56) References Cited

U.S. PATENT DOCUMENTS

2009/0210137 A1   8/2009   Kokubo et al.
2019/0360407 A1   11/2019  Mikawa et al.

FOREIGN PATENT DOCUMENTS

JP   2006-291792       10/2006
JP   2009-197591 A     9/2009
(Continued)

OTHER PUBLICATIONS

International Search Report (PCT/ISA/210) issued in PCT Application No. PCT/JP2021/023772 dated Aug. 31, 2021 with English translation (five (5) pages).
(Continued)

*Primary Examiner* — Loren C Edwards
(74) *Attorney, Agent, or Firm* — Crowell & Moring LLP

(57) ABSTRACT

An object of the present invention is to obtain a controller device for a variable valve timing apparatus capable of controlling a phase to an arbitrary fixed valve timing from immediately before an internal combustion engine stops until after the internal combustion engine has stopped. The controller device for the variable valve timing apparatus according to the present invention performs, during engine stop processing of the internal combustion engine, normal control of changing the relative rotational phase of a camshaft to a most advanced position or a most retarded position when the rotational speed of a crankshaft is equal to or more than a first threshold, and low-speed control of fixing a current or a voltage supplied to the motor to be constant to maintain the relative rotational phase of the camshaft at the most advanced position or the most retarded position in a
(Continued)

period from when the rotational speed of the crankshaft is lower than the first threshold until the rotational speed becomes zero.

8 Claims, 16 Drawing Sheets

(51) Int. Cl.
*F01L 1/356* (2006.01)
*F02D 13/08* (2006.01)

(52) U.S. Cl.
CPC ............ *F02D 13/02* (2013.01); *F02D 13/08* (2013.01); *F01L 2800/01* (2013.01); *F01L 2800/03* (2013.01); *F01L 2820/032* (2013.01)

(58) Field of Classification Search
CPC ... F01L 1/34; F01L 1/344; F01L 1/352; F01L 1/356; F01L 2800/01; F01L 2800/03; Y02T 10/12
See application file for complete search history.

(56) References Cited

FOREIGN PATENT DOCUMENTS

| | | | |
|---|---|---|---|
| JP | 2012-246860 A | 12/2012 | |
| JP | 2016-199202 A | 12/2016 | |
| JP | 2018-131985 A | 8/2018 | |
| JP | 2018123716 A * | 8/2018 | ............ F01L 1/356 |
| JP | 2019-157750 A | 9/2019 | |

OTHER PUBLICATIONS

Japanese-language Written Opinion (PCT/ISA/237) issued in PCT Application No. PCT/JP2021/023772 dated Aug. 31, 2021 (three (3) pages).

* cited by examiner

INTAKE VALVE MOST ADVANCED PROFILE

INTAKE VALVE MOST RETARDED PROFILE

FIG. 7

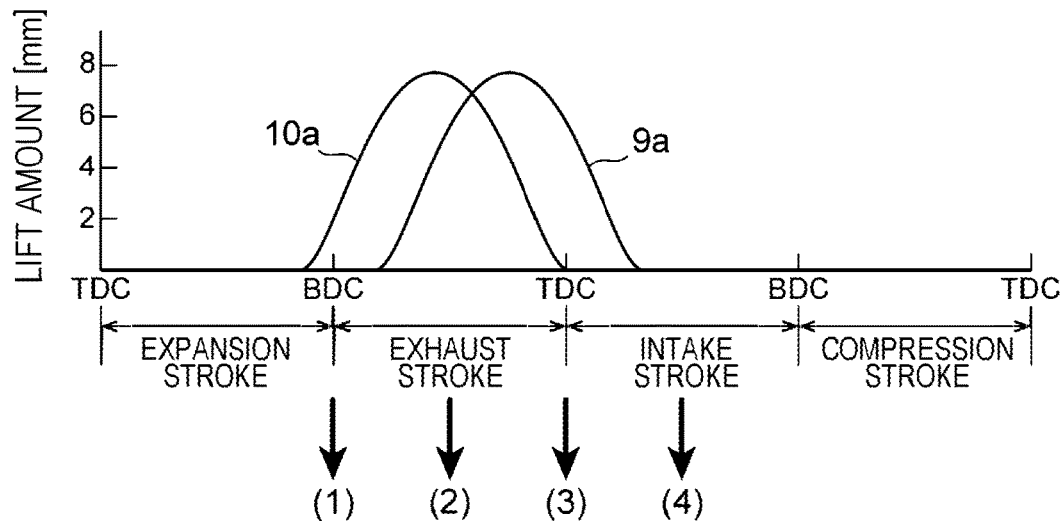

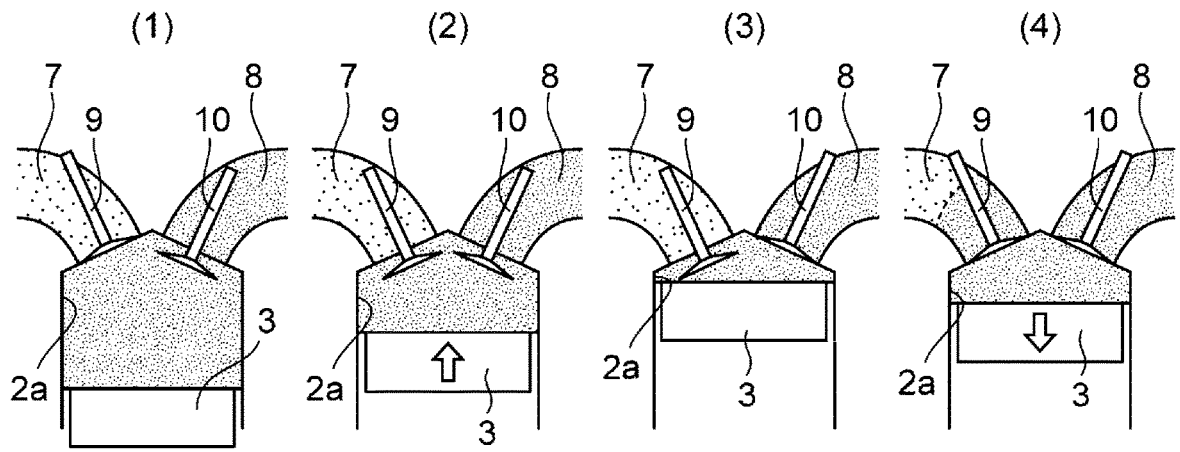

(1) ONLY EXHAUST VALVE IS IN OPEN STATE AT BOTTOM DEAD CENTER BEFORE EXHAUST STROKE (2) BOTH INTAKE VALVE AND EXHAUST VALVE ARE IN OPEN STATE DURING EXHAUST STROKE (3) AFTER EXHAUST STROKE, EXHAUST VALVE IS CLOSED AND ONLY INTAKE VALVE IS IN OPEN STATE AT TOP DEAD CENTER (4) PISTON POSITION LOWERS, AND INTAKE VALVE IS CLOSED AT IVC 140deg. CA ABDC ACTUAL INTAKE AMOUNT FOR 40deg. CA FROM TOP DEAD CENTER IS OBTAINED

NEGATIVE PRESSURE STATE IS REALIZED IN INTAKE STROKE THEREAFTER

CONTROLLER DEVICE FOR VARIABLE VALVE TIMING APPARATUS

TECHNICAL FIELD

The present invention relates to a controller device for a variable valve timing apparatus that changes a valve timing (opening/closing timing) of an intake valve or an exhaust valve using a motor as a drive source.

BACKGROUND ART

Conventionally, there are a timing pulley, a sprocket, a gear, and the like as a driving force transmission mechanism for synchronously rotating an intake valve camshaft and an exhaust valve camshaft with respect to a crankshaft that is an output shaft of an internal combustion engine. A variable valve timing apparatus that is incorporated in the timing pulley, the sprocket, the gear, or the like and adjusts a valve timing of an intake valve according to an operation state of the internal combustion engine is known. In recent years, hydraulic variable valve timing apparatuses have been replaced with electric variable valve timing apparatuses, and the ranges of the controllable temperature and the controllable engine speed tend to increase. However, in an existing electric variable valve timing apparatus, it is particularly difficult to perform control at a low engine speed, and it is difficult to control the valve timing of the intake valve to an arbitrary timing when the engine of an automobile stops. In practice, a system has been adopted in which the valve timing is controlled to a so-called default position and a mechanically reached position of the variable valve timing apparatus to wait for the next engine start.

CITATION LIST

Patent Literature

PTL 1: JP 2009-197591 A
PTL 2: JP 2019-157750 A
PTL 3: JP 2018-131985 A

SUMMARY OF INVENTION

Technical Problem

An electric variable valve timing apparatus includes a mechanism that changes the phase of a camshaft that drives an intake valve or an exhaust valve. In the present mechanism, output from a motor is amplified by a speed reducer and transmitted to the camshaft. In a case where it is desired to start from an arbitrary valve timing at the time of the next start of an internal combustion engine, it is difficult to convert the phase of the camshaft even if the motor is energized during the stop of the internal combustion engine. Therefore, it is desirable to convert the phase of the camshaft immediately before stop of the internal combustion engine. The phase of the camshaft during the operation of the internal combustion engine is calculated by the relative value between a cam angle sensor and a crank angle sensor. However, immediately before the internal combustion engine stops, roughness occurs in the detection cycle due to a decrease in the speed of the internal combustion engine, and signals acquired by the cam angle sensor and the crank angle sensor become extremely rough. Therefore, there is a problem that it is difficult to control the valve timing to an accurate phase.

In response to such a problem, for example, JP 2009-197591 A (PTL 1) discloses a control method of a variable valve timing apparatus in a current known example in which duty control of power supply work to a motor is performed so that the valve timing is close to a target advanced position in small increments, thereby preventing overshoot at a target phase.

Furthermore, JP 2019-157750 A (PTL 2) discloses a hydraulic variable valve timing apparatus in which the valve timing of an intake valve in a cranking state where an engine is driven by a main motor is retarded, and therefore an actual compression ratio is reduced and required energy at cranking is reduced.

The above-described PTL 1 describes control near a target phase aimed at preventing overshoot in the variable valve timing apparatus, but does not describe an operation at the time of engine stop, and it is difficult to restart the engine from an arbitrary phase. Furthermore, in the above-described PTL 2, a state where the intake valve at the time of engine restart is controlled to an arbitrary position by the hydraulic variable valve timing apparatus has been realized; however, there is a problem that this cannot be expanded into an electric variable valve timing apparatus, and application to an early-closing type Miller-cycle engine is not considered.

The present invention takes into consideration such a problem at the time of low speed of the internal combustion engine and an object thereof is to provide a controller device for a variable valve timing apparatus capable of controlling the phase of the valve timing at an arbitrary fixed valve timing from immediately before the internal combustion engine is stopped until after the internal combustion engine has stopped in the electric variable valve timing apparatus.

Solution to Problem

In order to achieve the above object, a controller device for a variable valve timing apparatus according to the present invention is a controller device applied to an internal combustion engine including the variable valve timing apparatus that changes a relative rotational phase of a camshaft with respect to a crankshaft of the internal combustion engine by adjusting a motor speed of a motor connected to the camshaft, the controller device including a controller unit that controls the variable valve timing apparatus, in which during engine stop processing of the internal combustion engine, the controller unit performs normal control of adjusting a current or a voltage supplied to the motor according to the rotational speed of the crankshaft to change the relative rotational phase of the camshaft to a most advanced position or a most retarded position when the rotational speed of the crankshaft is equal to or higher than a first threshold, and low-speed control of fixing the current or the voltage supplied to the motor to be constant to maintain the relative rotational phase of the camshaft at the most advanced position or the most retarded position during a period from when the rotational speed of the crankshaft becomes lower than the first threshold to when the rotational speed becomes zero.

Advantageous Effects of Invention

According to the present invention, the phase of the valve timing of the intake valve can be controlled to the most advanced position or the most retarded position until the rotational speed of the crankshaft decreases to an arbitrary rotational speed and the internal combustion engine has completely stopped. Further features related to the present invention will become apparent from the description of the present Description and the accompanying drawings. Moreover, problems, configurations, and effects other than those described above will be apparent from the following description of the embodiment below.

BRIEF DESCRIPTION OF DRAWINGS

FIG. 7 is a schematic diagram of the inside of an engine cylinder when an engine cycle is carried out with the intake profile illustrated in FIG. 5.

DESCRIPTION OF EMBODIMENTS

Hereinafter, specific embodiments of a variable valve timing apparatus of the present invention will be described with reference to the drawings. Note that, in each drawing, portions denoted by the same reference signs indicate the same or corresponding portions.

First Embodiment

Engine Configuration

Figure 1:
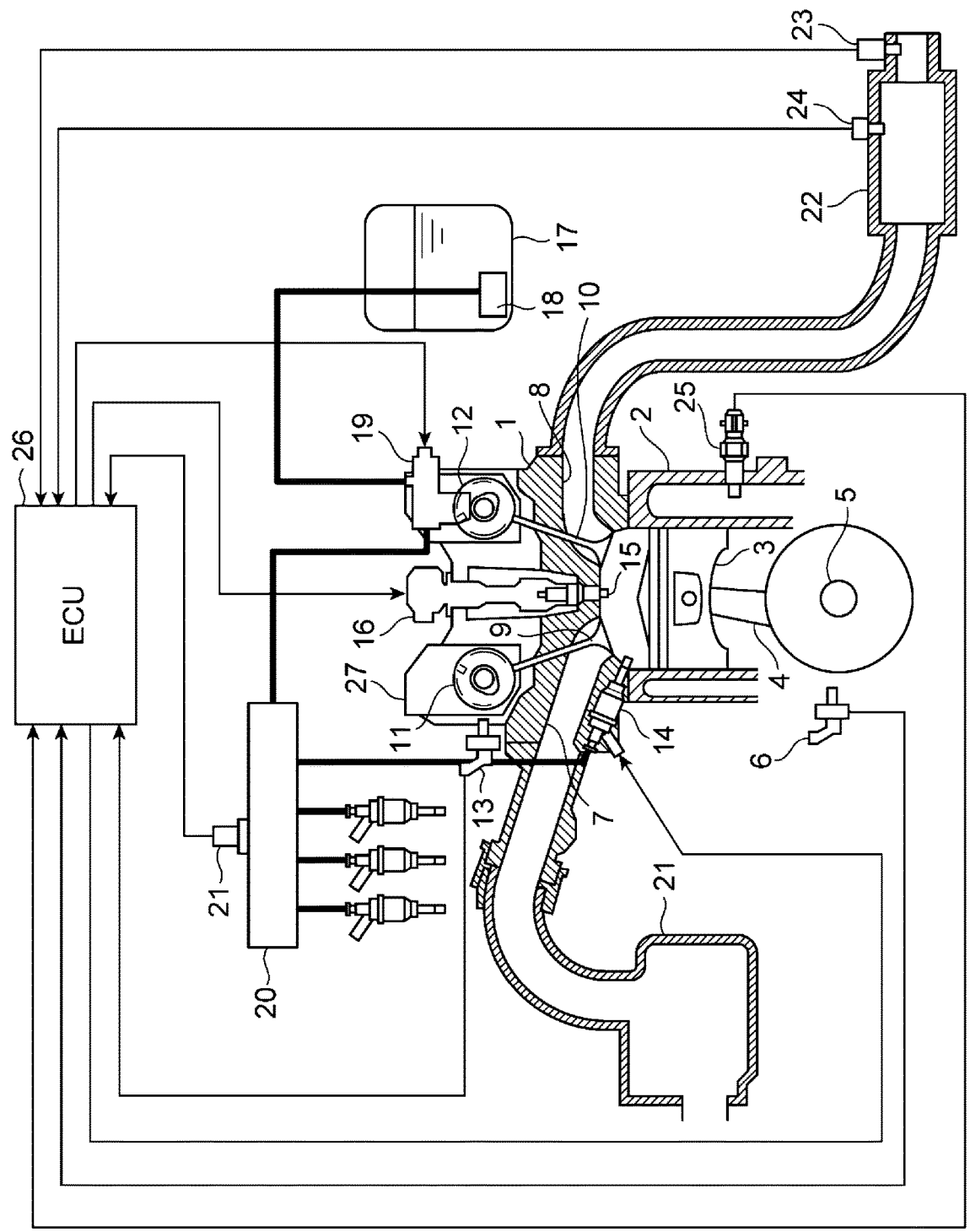
FIG. 1 is a configuration diagram of an engine system according to the present embodiment to which a controller device for a variable valve timing apparatus of the present invention is applied.

FIG. 1 is a configuration diagram of an engine system according to the present embodiment to which a variable valve timing apparatus of the present invention is applied.

The engine system of the present embodiment is for a series hybrid vehicle equipped with a traction motor for traveling and an engine dedicated to power generation. In the series hybrid vehicle, control is performed to operate the engine to generate power when the battery charge capacity becomes lower than a certain threshold, and to stop the engine when the battery charge capacity becomes higher than the certain threshold.

The engine is an internal combustion engine including a four-cycle engine, and a combustion chamber is formed by a cylinder head 1, a cylinder block 2, and a piston 3 inserted into the cylinder block 2. The piston 3 is connected to a crankshaft 5 via a connecting rod 4, and a crank angle sensor 6 can detect the rotational speed of the crankshaft, that is, the engine speed.

An intake pipe 7 and an exhaust pipe 8 are connected to the combustion chamber. Each of the intake pipe 7 and the exhaust pipe 8 is branched into two and connected to one cylinder. Two intake valves 9 and two exhaust valves 10 are provided to open and close openings opened to the combustion chamber. An intake cam 11 and an exhaust cam 12 are provided at upper parts of the intake valve 9 and the exhaust valve 10, respectively, and the intake valve 9 and the exhaust valve 10 are opened and closed by rotating these cams 11 and 12. Although not illustrated, an intake cam pulley coupled to the intake cam, an exhaust cam pulley coupled to the exhaust cam, and a crank pulley coupled to the crankshaft 5 are provided on the engine side portion, and these are connected via a timing belt. As a result, the crankshaft 5 rotates during engine operation, and therefore the intake cam 11 and the exhaust cam 12 are rotated. The sizes of the crank pulley and the cam pulleys are set such that the intake cam 11 and the exhaust cam 12 make one rotation when the crankshaft 5 makes two rotations. A camshaft of the intake cam 11 is provided with a variable valve timing apparatus 27 capable of changing the phase (relative rotational phase) with respect to the crankshaft 5. The variable valve timing apparatus 27 is configured to change the phase of the camshaft of the intake cam 11 with respect to the crankshaft 5 by adjusting a motor speed of a motor (VTC motor) connected to the camshaft. A motor generator that functions as a generator at the time of power generation and functions as a motor at the time of engine start or stop is connected to the crankshaft 5. An intake cam angle sensor 13 is provided at the intake cam 11 to detect the rotational speed of the cam.

An injector 14 is provided on an intake side of the combustion chamber, and a spark plug 15 and a spark coil 16 are provided in an upper part of the combustion chamber.

Fuel is stored in a fuel tank 17 and sent to a high-pressure fuel pump 19 through a fuel pipe by a feed pump 18. The high-pressure fuel pump 19 is driven by the exhaust cam 12, and the boosted fuel is sent to a common rail 20. A fuel pressure sensor 21 is provided at the common rail 20 so that the fuel pressure can be detected. The common rail 20 and the injector 14 provided to each cylinder are connected by a fuel pipe.

A three-way catalyst 22 is provided at an end of the exhaust pipe 8, and an oxygen sensor 23 is provided downstream thereof. A temperature sensor 24 is provided at the three-way catalyst 22, and detects the temperature of the three-way catalyst 22. The cylinder block 2 is provided with a water temperature sensor 25 that measures the temperature of water flowing through the cylinder block 2.

Signals of the water temperature and the engine speed are input to an engine control unit (ECU) 26, and ON/OFF of fuel injection and the phase of the variable valve timing apparatus 27 are controlled on the basis of these pieces of information. That is, the ECU 26 constitutes a controller device for the variable valve timing apparatus 27. The ECU 26 includes a CPU and a memory, and the CPU constitutes a controller unit of the controller device for the variable valve timing apparatus 27.

<Overall Configuration and Driving Principle of Electric Variable Valve Timing Apparatus>

Figure 2:
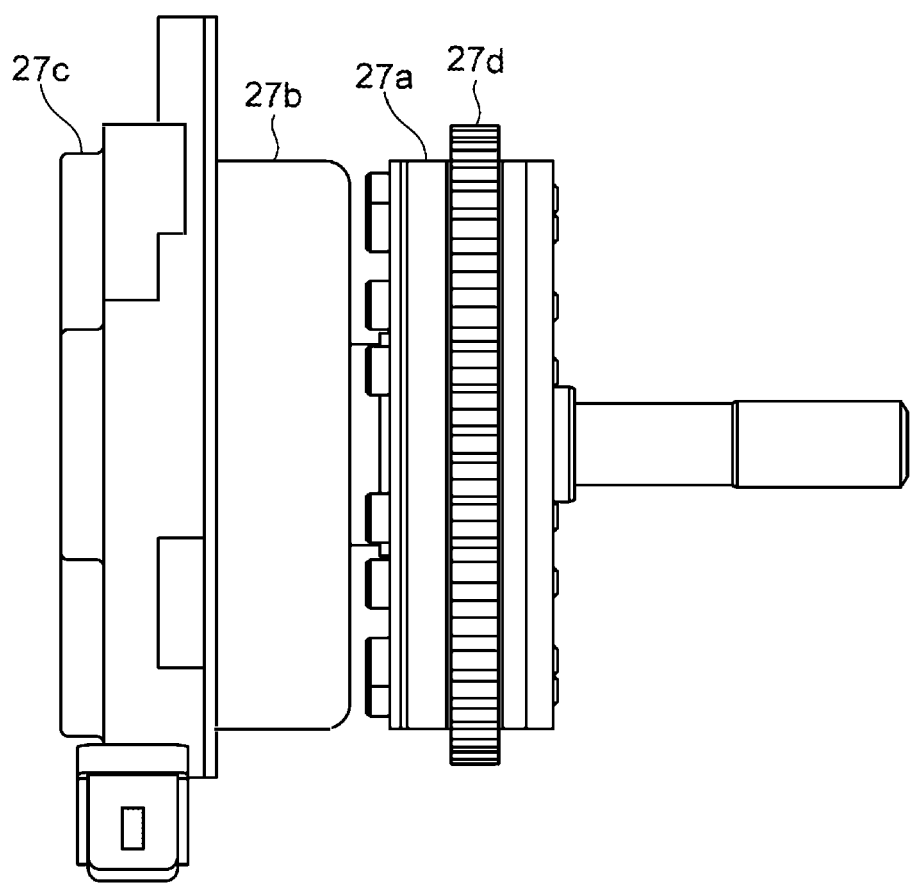
FIG. 2 is a view illustrating an overall configuration of the variable valve timing apparatus according to the present embodiment.
Figure 3:
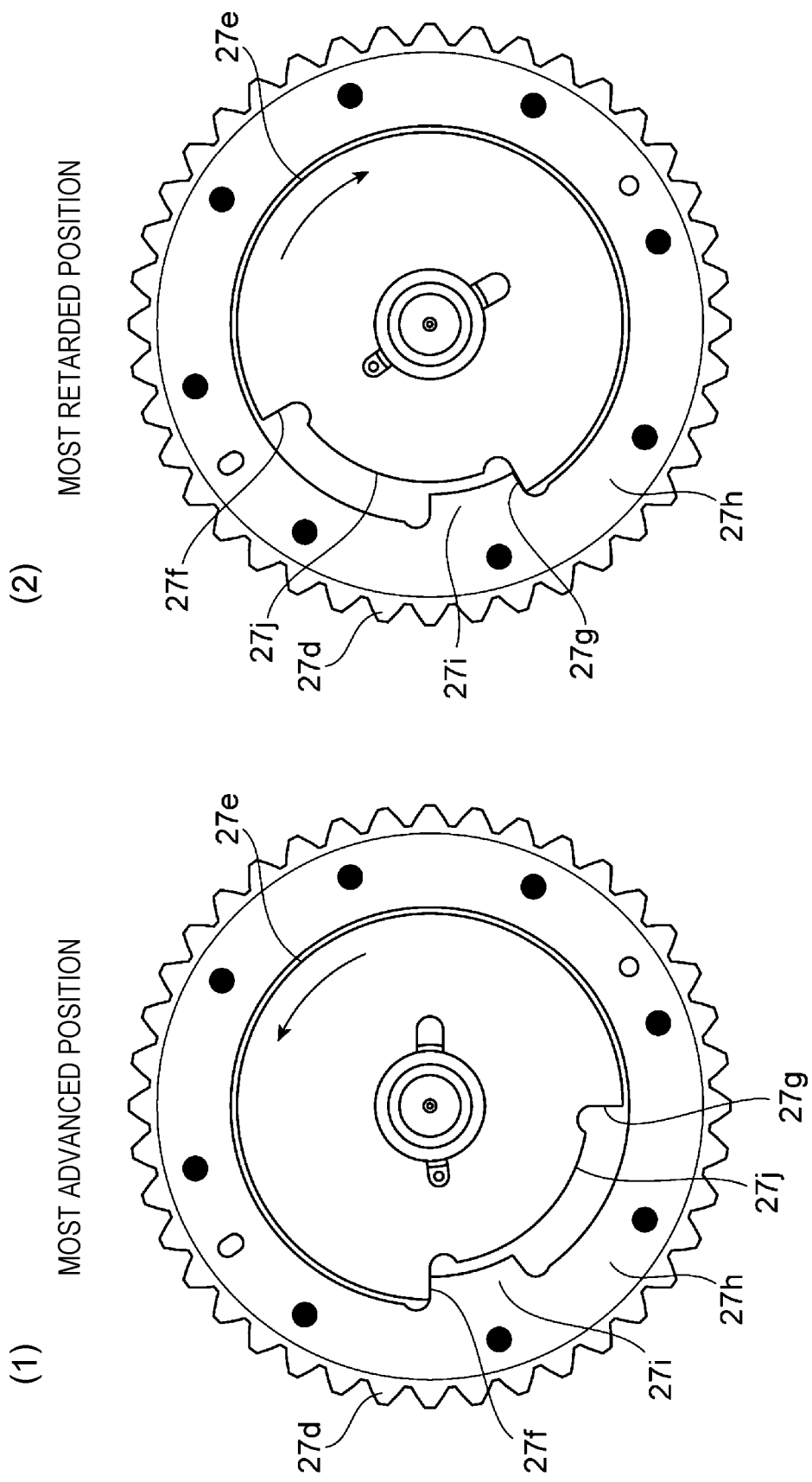
FIG. 3 is a cross-sectional view of a speed reducer in the variable valve timing apparatus according to the present embodiment.

The relative phase difference between the crankshaft 5 and the camshaft is calculated by inputting the rotational speed signals of the crankshaft 5 and the intake cam 11/exhaust cam 12 detected by the crank angle sensor 6 and the cam angle sensor 13 to the ECU 26. In this engine configuration, the crank angle is acquired at every 6 deg. CA, and the cam angle is acquired at every 180 deg. CA. The variable valve timing apparatus 27 provided to the intake cam 11 is an electric type, and the configuration thereof is illustrated in FIGS. 2 and 3.

Figure 4:
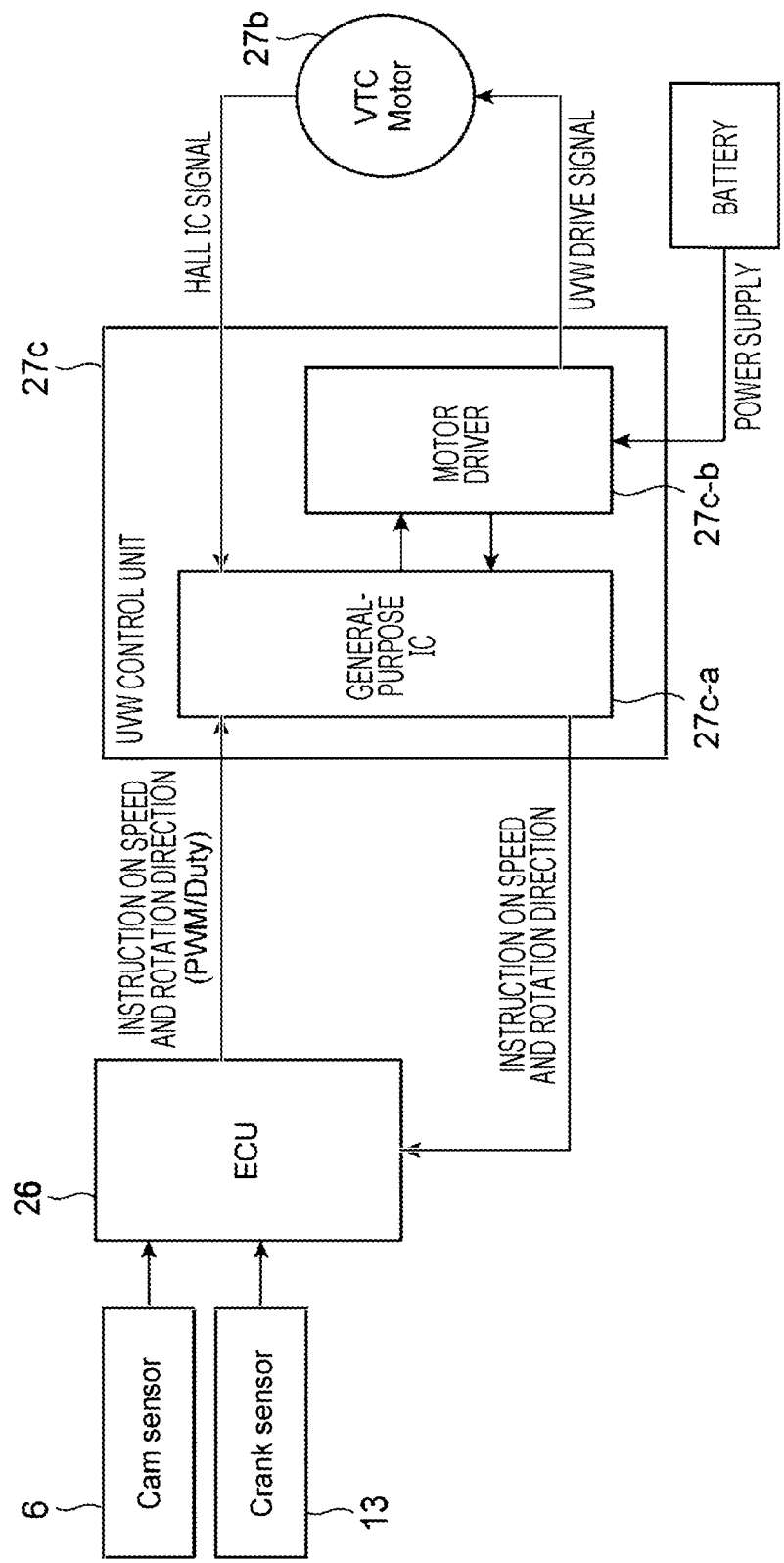
FIG. 4 is a control block diagram of the controller device for the variable valve timing apparatus according to the present embodiment.

The electric variable valve timing apparatus 27 includes, from the intake cam 11 side, a speed reducer 27a including a sprocket 27d, an intake cam driving motor 27b, and a control unit 27c. FIG. 3 illustrates a cross-sectional view of the speed reducer 27a. Note that as a configuration of a mechanical structural part of the electric variable valve timing apparatus 27, for example, a configuration disclosed in PTL 3 can be applied. The control unit 27c includes a general-purpose IC 27c-a and a motor driver 27c-b as calculation units for driving the motor. FIG. 4 illustrates a control block diagram in the present embodiment based on these.

Next, an acquisition path until the ECU 26 of the valve timing apparatus in the present embodiment acquires information on the actual speed and the rotation direction of the intake cam driving motor 27b will be described. First, rotation of the intake cam driving motor 27b is detected by a Hall IC provided in the control unit 27c, and the generated voltage is acquired by the general-purpose IC 27c-a provided in the circuit in the control unit. In the general-purpose IC 27c-a, the input voltage is converted into the speed and the rotation direction of the intake cam driving motor 27b and is output to the ECU 26, so that the ECU 26 acquires information on the motor speed and the rotation direction.

Furthermore, it is required to sequentially calculate the optimum phase of the variable valve timing apparatus 27 and to control the phase to an appropriate phase. Therefore, the ECU 26 calculates an appropriate valve timing from the required engine speed and the required engine torque on the basis of the calculation result of the actual phase. In the ECU 26, the appropriate valve timing that has been calculated is converted into a target rotation direction and a target speed of the intake cam driving motor 27b of the variable valve timing apparatus 27. The target rotation direction and the target speed are sent to the control unit 27c of the valve timing apparatus as a PWM signal by duty control.

In the control unit 27c, the general-purpose IC 27c-a receives instructions on the motor target speed and the motor target rotation direction via a target motor speed reception unit. The general-purpose IC 27c-a has acquired the actual speed and the actual rotation direction of the intake cam driving motor 27b of the variable valve timing apparatus 27, performs feedback control on the signal of the motor target speed and the motor target speed and transmits the signal to the motor driver 27c-b so as to obtain an appropriate motor speed. The motor driver 27c-b converts the signal into a UVW three-phase AC signal and outputs the signal as a UVW drive signal to the intake cam driving motor 27b to drive the intake cam driving motor 27b. The intake cam driving motor 27b is driven by a current and a voltage supplied as the UVW drive signal from the motor driver 27c-b.

In the general-purpose IC 27c-a in the present embodiment, a signal for receiving the rotation direction and speed command of the intake cam driving motor 27b from the ECU 26 has the following specifications. The rotation in the same direction as the rotation direction of the camshaft is defined as forward rotation, the rotation in the opposite direction is defined as reverse rotation, and the forward rotation and the reverse rotation are distinguished by the frequency of the input PWM. The normal rotation is 100 Hz, and the reverse rotation is 200 Hz.

Normally, the rotational speed of the crankshaft 5:the rotational speed of the intake cam 11 is 2:1; however, in order to convert the phases of the crankshaft 5 and the intake cam 11 by the variable valve timing apparatus 27, it is necessary to control the rotational speed of the intake cam 11 to be higher or lower than ½ times the rotational speed of the crankshaft 5. Performing phase control in the direction of opening early and closing early the intake valve or the exhaust valve 10 in the engine cycle by instantaneously increasing the rotational speed of the camshaft is referred to as advance control. In contrast, performing phase control in the direction of delaying opening and closing of the intake valve or the exhaust valve 10 in the engine cycle by instantaneously decreasing the rotational speed is referred to as retard control.

Here, there are a late-closing Miller-cycle engine and an early-closing Miller-cycle engine as types of an engine on which the variable valve timing apparatus 27 is mounted to implement a Miller-cycle. In the present embodiment, an engine of a type in which the variable valve timing apparatus 27 is mounted on the intake cam 11 to enable an early-closing Miller-cycle is assumed. The early-closing Miller-cycle refers to an engine stroke in which the intake valve 9 is closed before the piston 3 reaches the bottom dead center in an intake stroke of the four-cycle engine. The engine described in the present embodiment has a configuration capable of establishing the early-closing Miller-cycle by converting the phase of the intake cam 11 to the advance side by the electric variable valve timing apparatus 27 that is mounted on the engine.

Here, a phase conversion method of the intake cam 11 and the crankshaft 5 by the electric variable valve timing apparatus 27 will be described. FIG. 3(1) is a view illustrating a state in which the speed reducer 27a is at the most advanced position, and FIG. 3(2) is a view illustrating a state in which the speed reducer 27a is at the most retarded position. As illustrated in FIG. 3, the speed reducer 27a of the electric variable valve timing apparatus 27 includes a drive rotating body 27e having a recess 27j and a driven rotating body 27h having a protrusion 27i in the internal structure. The speed reducer 27a has a shape in which the recess 27j of the drive rotating body 27e is fitted to the protrusion 27i of the driven rotating body 27h. The mechanism is adopted in which the protrusion 27i reciprocates in the recess 27j along the rotation direction of the camshaft of the intake cam 11, and abuts on a most advanced stopper 27f on one side of the recess 27j or a most retarded stopper 27g on the other side of the recess 27j, thereby physically determining the most advanced position and the most retarded position with respect to the phase of the intake cam 11, enabling phase conversion within the range of the physically most advanced position and the physically most retarded position. As the phases of the drive rotating body 27e and the driven rotating body 27h of the intake cam 11 are shifted, the phases of the intake cam 11 connected to the drive rotating body 27e and the crankshaft 5 connected to the driven rotating body 27h via the timing belt are converted.

<Purpose of Mounting Variable Valve Timing Apparatus and Operation Principle Thereof at Low Engine Speed>

Next, on the basis of the phase conversion driving principle by the variable valve timing apparatus 27, an operation sequence in an engine stop process will be described. The request operation to the variable valve timing apparatus 27 in the engine stop process is to cause the controller device of the variable valve timing apparatus 27 to control the phase of the intake cam 11 to be at the most advanced position before engine stop, and to completely stop (zero rotation) the engine while maintaining the phase.

If the phase of the intake cam 11 can be maintained at the most advanced position even while the engine is completely stopped by the phase control in the engine stop process, restart from the most advanced position of the phase of the intake cam 11 is possible also at the time of the next engine restart. As an effect of restarting the engine in a state where the valve timing of the intake valve 9 is controlled to the most advanced position, there is a reduction in the intake flow rate into an engine cylinder in a motoring period in which the engine speed is increased by the generator before the initial explosion. Since the intake air flow rate into the engine cylinder decreases at the time of engine start, the air flow rate in a compression stroke of the engine is reduced, so that pumping loss is reduced. The suppression of the pumping loss during the motoring period reduces the load on the vertical movement of the piston 3, and the engine speed variation when the engine speed increases is suppressed. Finally, the vibration at the time of engine restart can be reduced by suppressing the engine speed variation. Therefore, setting the phase of the intake cam 11 at the time of engine restart to the most advanced position is requested in the present embodiment.

Figure 5:
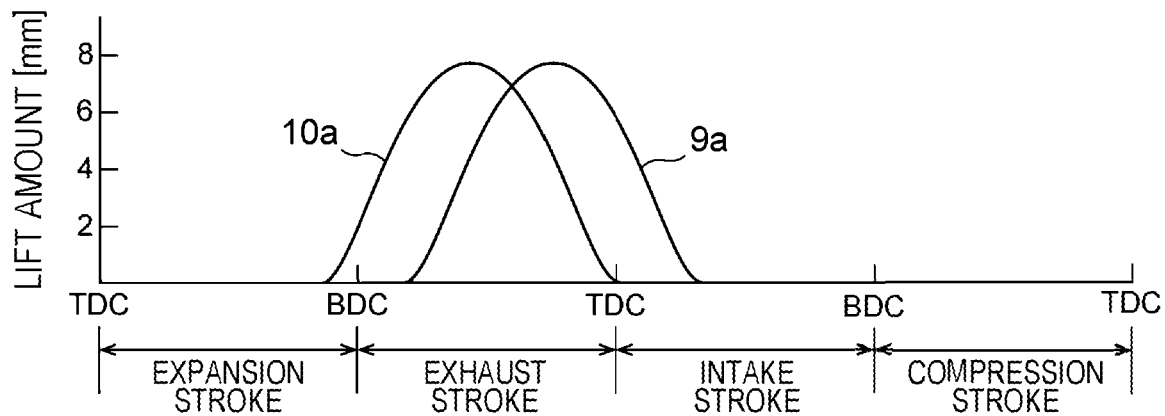
FIG. 5 is a diagram illustrating profiles of an intake cam and an exhaust cam when an intake camshaft is most advanced in a case where an early-closing Miller-cycle engine is mounted (first embodiment).
Figure 6:
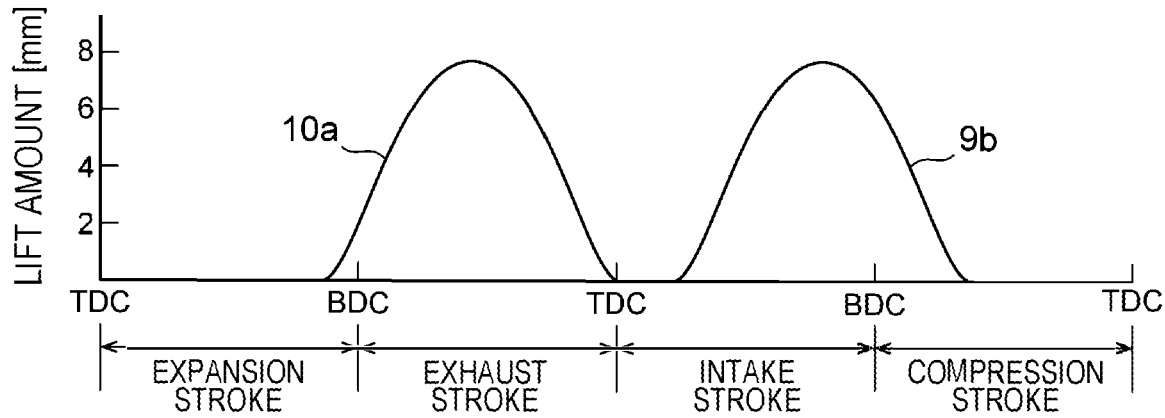
FIG. 6 is a diagram illustrating profiles of the intake cam and the exhaust cam when the intake camshaft is most retarded in a case where the early-closing Miller-cycle engine is mounted (first embodiment).

FIG. 5 illustrates the most advanced profile of the intake valve 9 in the present embodiment, and FIG. 6 illustrates the most retarded profile of the intake valve 9 in the present embodiment. In FIGS. 5 and 6, the profiles of the intake valve 9 are denoted by reference signs 9a (most advanced profile) and 9b (most retarded profile), and the profile of the exhaust valve 10 is denoted by reference sign 10a. An engine cycle operation at the physically most advanced position in the speed reducer 27a is defined as the most advanced profile 9a of the intake valve 9. That is, an object of the present embodiment is to restart the engine in a state where the profile of the intake valve 9 in FIG. 5, that is, the valve timing of the intake valve 9 is excessively advanced to the most advanced position.

The angle of action of each of the intake cam 11 and the exhaust cam 12 in the present embodiment is 180 deg. CA, and when the intake cam 11 is set to the most advanced phase, the phase of the intake cam 11 is advanced to IVC 140 deg. CA_ABDC (valve timing of closing the intake valve after the crankshaft 5 rotates by an angle of 140 deg after the intake bottom dead center). Therefore, FIG. 7 illustrates a state in the engine cylinder in each scene during the engine cycle when the intake cam 11 is controlled to the most advanced position. By starting the engine by controlling the phase of the intake cam 11 in the present configuration to IVC 140 deg. CA_ABDC, the compression load applied to the piston 3 in the compression stroke can be reduced to about ⅓ of that in the conventional engine start (IVC 60 deg. CA_ABDC).

Incidentally, the phase of the intake cam 11 with respect to the rotation of the crankshaft 5 of the engine equipped with the variable valve timing apparatus 27 as described above is calculated by the ECU 26 performing feedback control of feeding back the speed of the intake cam driving motor 27b in the variable valve timing apparatus 27 to the rotational speeds of the crank angle sensor 6 and the intake cam angle sensor 13 acquired by the ECU 26. In a case where the engine speed is equal to or higher than a certain value, the phase of the intake cam 11 can be calculated without any problem by the above method. However, in an engine low-speed region where the engine speed is lower than the certain value, for example, immediately before engine stop or immediately after engine restart, it is difficult to calculate the phase of the intake cam 11 by the above method. This is because, in the crank angle sensor 6 that detects the rotational speed of the crankshaft 5 at every 6 deg, the interval of the signal input to the crank angle sensor 6 becomes rough with respect to time in the engine low-speed region, and roughness occurs in the detection cycle.

Figure 8:
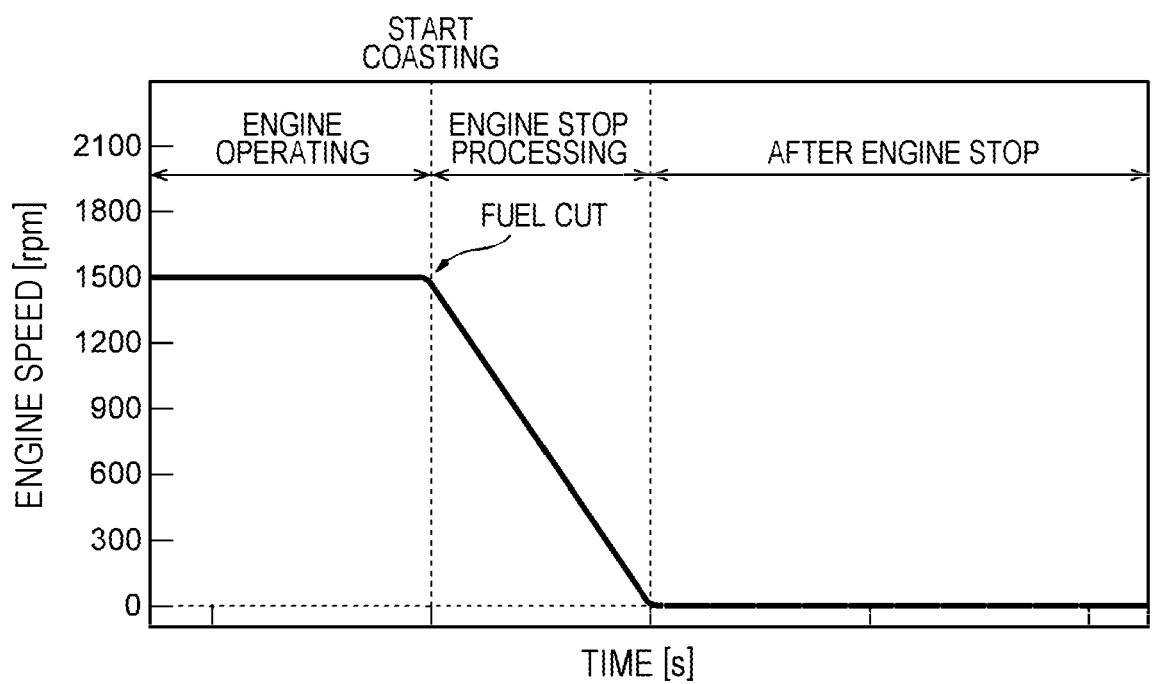
FIG. 8 is a diagram illustrating a change in engine speed in an engine stop process.

Therefore, in the present embodiment, in the engine low-speed region, the phase of the intake cam 11 is secured by a method of switching from normal control to special control. FIG. 8 illustrates the definition of the operation name for each time series from the time of the engine low speed until after engine stop in an engine stop sequence.

Figure 9:
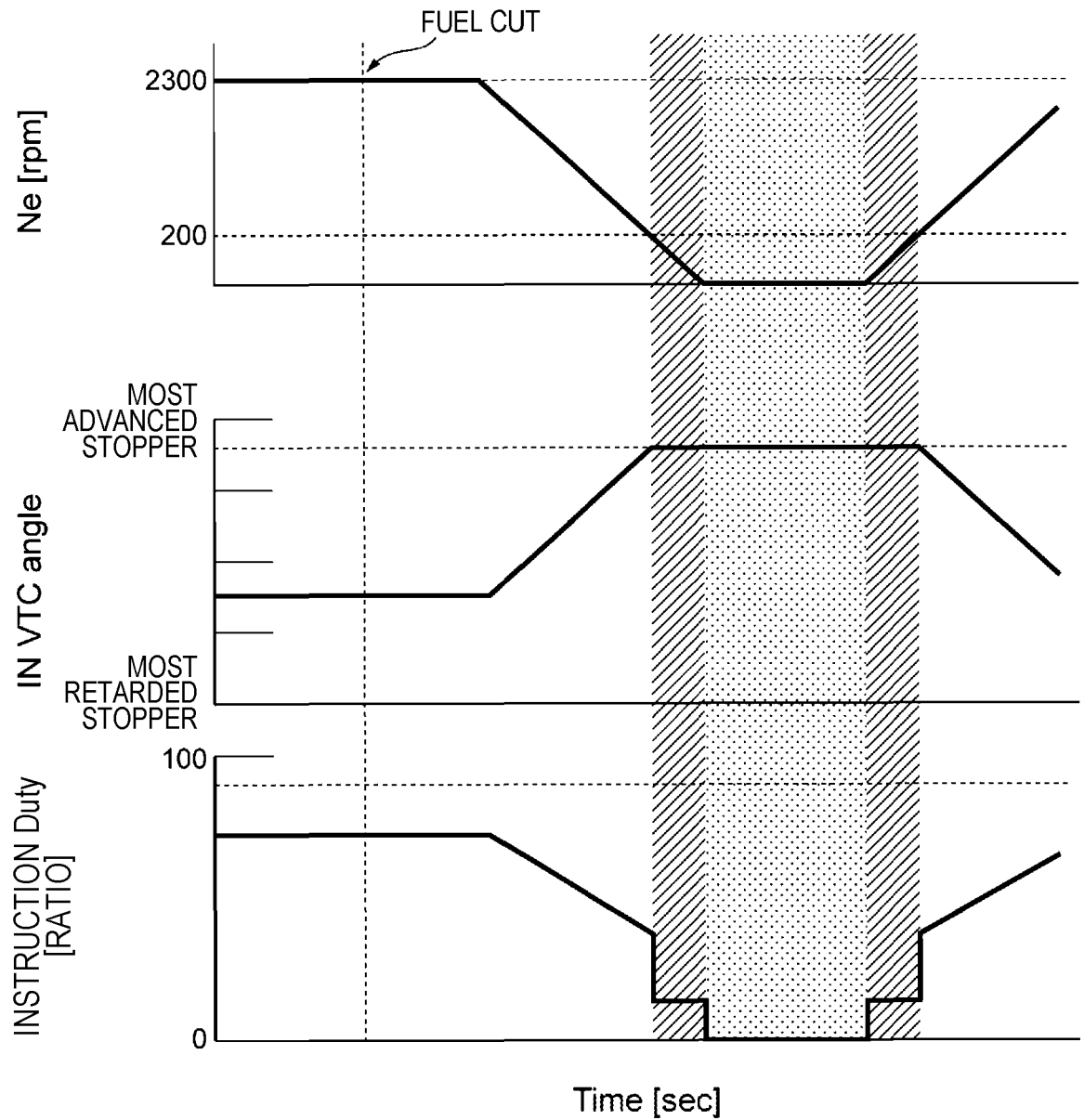
FIG. 9 is a diagram for explaining a relationship among the engine speed, the phase of the intake valve, and an instruction duty from when the engine stops to when the engine is restarted.
Figure 10:
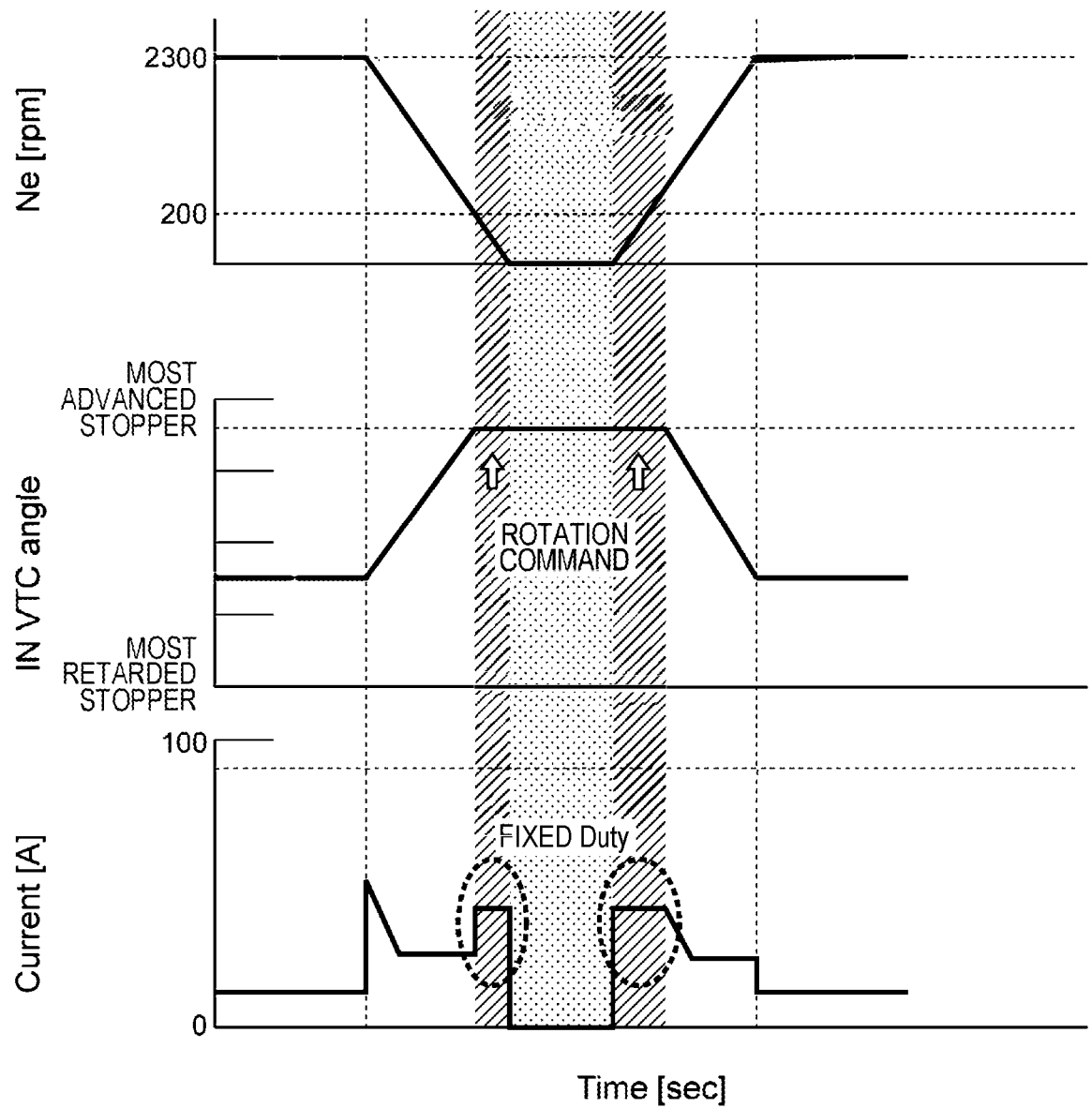
FIG. 10 is a diagram for explaining a relationship among the engine speed, the phase of the intake valve, and a load current to a circuit from when the engine stops to when the engine is restarted.

In response to an engine stop request from the ECU 26, a period called coasting from when fuel injection by a fuel injection device is stopped to when the engine speed becomes completely zero is defined as an "engine stop processing" period. A period after the engine speed completely becomes zero subsequent to the period of the engine stop processing is defined as "after engine stop". FIG. 9 illustrates sequences of the engine speed, the phase of the intake cam 11, and the instruction duty from engine operating, engine stop processing, after engine stop, to the next engine restart. In addition, FIG. 10 illustrates a history of the values of a current flowing into a power supply line from the battery in the sequence. Here, the instruction duty indicates an instruction on the motor speed and the motor rotation direction by a PWM signal from the ECU 26 illustrated in FIG. 4 to the control unit 27c of the variable valve timing apparatus 27.

<Definition of Application Timing of Present Embodiment>

Next, a control flow in the present embodiment will be described. In the present embodiment, the engine speed of 200 rpm in a state where a fuel cut signal in the ECU 26 is turned on is defined as a control switching condition (first threshold), a region of the engine speed of 200 rpm or more is defined as a normal control region, and a region of the engine speed lower than 200 rpm is defined as a low-speed control region.

Figure 11:
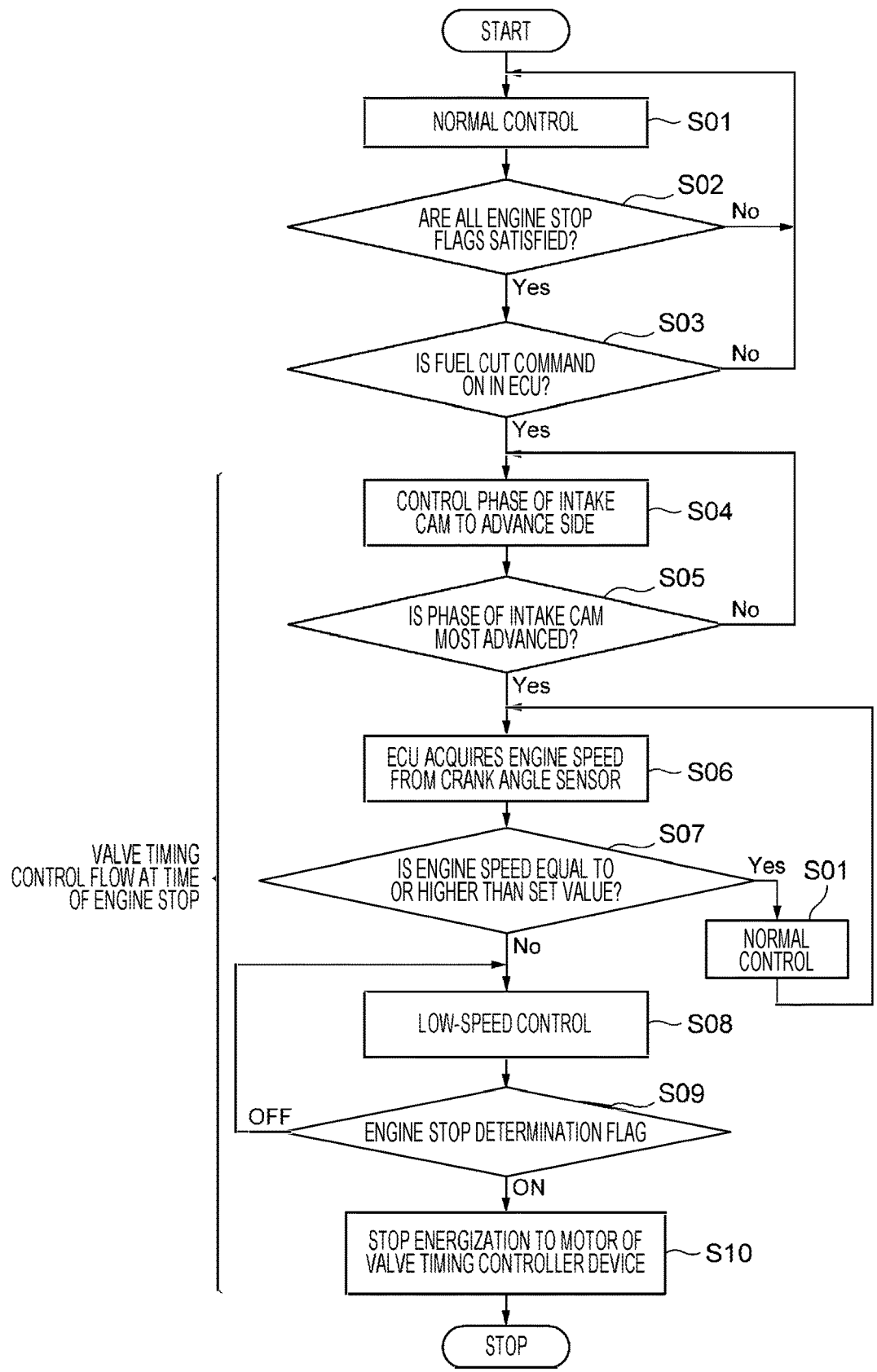
FIG. 11 is a flowchart for explaining phase control of the intake valve at the time of engine stop.
Figure 12:
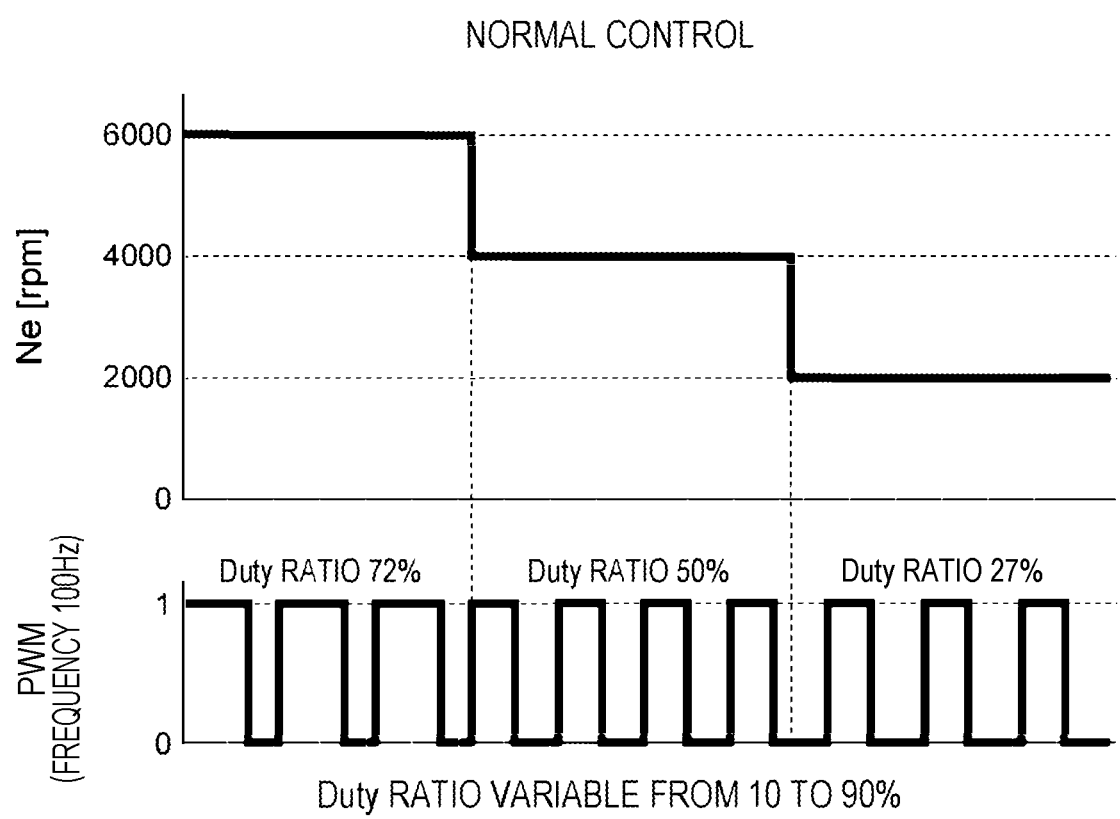
FIG. 12 is a diagram illustrating a relationship between an engine speed and a PWM signal during normal control at the time of engine stop.
Figure 13:
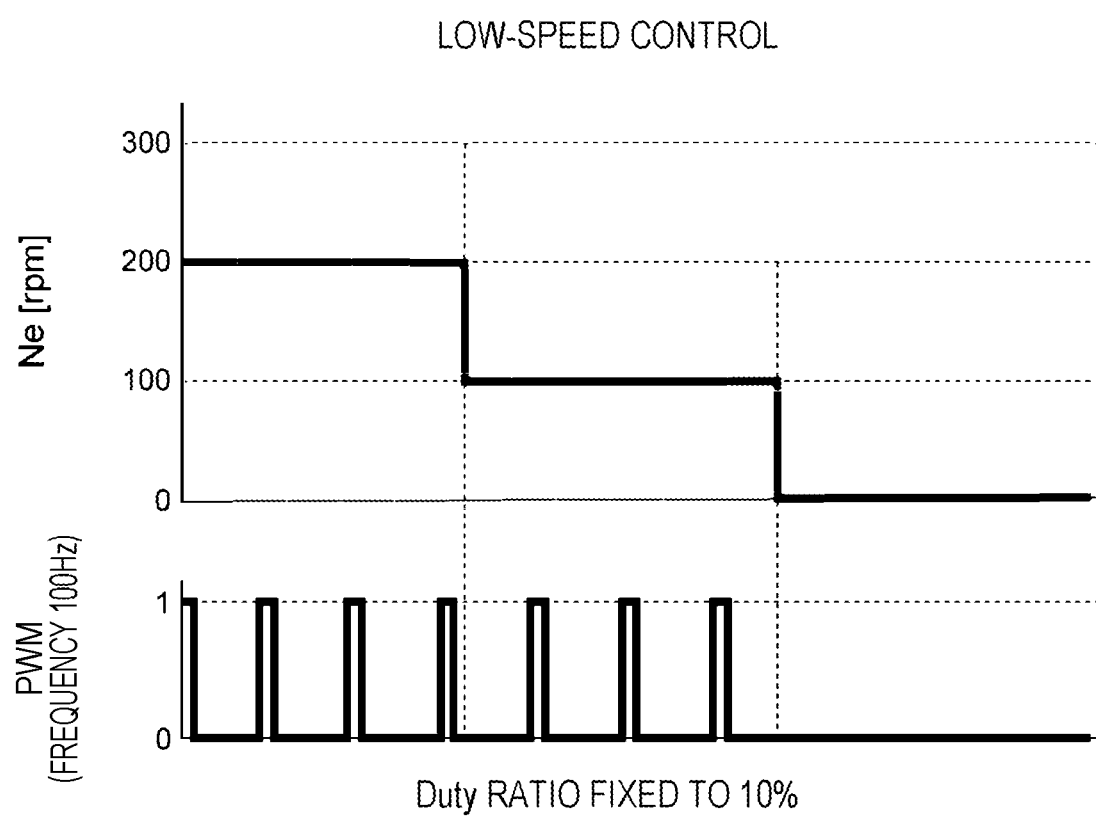
FIG. 13 is a diagram illustrating a relationship between an engine speed and a PWM signal during low-speed control at the time of engine stop.

FIG. 11 is a flowchart illustrating a determination method of normal control and low-speed control in the engine speed. FIGS. 12 and 13 are conceptual diagrams of duty control at the time of engine stop. FIG. 12 illustrates a state in which the duty ratio is switched in proportion to the engine speed as the normal control, and FIG. 13 illustrates a state in which a command is issued at a constant duty ratio not in proportion to the engine speed as the low-speed control. Hereinafter, the flowchart illustrated in FIG. 11 will be described separately for each step. In this flowchart, the start condition is engine operating, and the end condition is after engine stop.

<<Step S01>>

As described above, in the control of the variable valve timing apparatus 27 in engine operating, as the normal control, a PWM signal having the duty ratio proportional to the engine speed calculated by the ECU 26 on the basis of a signal from the crank angle sensor 6 is output to the control unit 27c.

<<Step S02>>

The ECU 26 determines whether an engine stop flag is satisfied. For example, the battery charge capacity is checked. At this time, a state in which the battery charge capacity reaches the upper limit value is defined as engine stop preparation completion. In a state where the battery charge capacity has not reached the upper limit value, the engine is not stopped even if the vehicle stops due to traffic lights, a traffic jam, or the like unless the key is taken out.

<<Step S03>>

Before stopping, the engine undergoes a process of shifting to a fuel cut operation for stopping fuel injection. At this time, since the engine torque is unnecessary, the engine enters a fuel cut operation mode, a fuel injection signal from the ECU 26 to the injector 14 is turned off, and fuel supply to the combustion chamber is stopped. During a fuel cut operation period after fuel cut, the engine is rotated by inertia, and the engine speed finally becomes zero. Therefore, the fact that it is confirmed that fuel injection has been stopped is set as one of the flags for shifting to the engine low-speed control.

<<Steps S04, S05>>

Simultaneously with the start of fuel cut, the ECU 26 performs control to advance the phase of the intake cam 11 with respect to the variable valve timing apparatus 27. The target phase of the intake cam 11 after the fuel cut is set to the most advanced position (the most advanced profile 9a of the intake cam in FIG. 5), and the completion of the phase conversion to the most advanced position is set as one of the flags for shifting to the engine low-speed control.

<<Steps S06, S07>>

As a condition for switching between the normal control and the low-speed control, switching is performed using the engine speed (=the rotational speed of the crankshaft) as a threshold as described above. A description will be given assuming that the first threshold in the present embodiment is the engine speed of 200 rpm. That is, as described above, the condition for starting the low-speed control is an AND condition that the engine speed is lower than 200 rpm, fuel cut is performed, and the phase of the intake cam 11 is controlled to the most advanced position.

<<Step S08>>

As described above, at the moment when the engine speed falls below 200 rpm in the fuel cut state, the normal control illustrated in FIG. 12 is switched to the low-speed control illustrated in FIG. 13, and the duty ratio of the PWM signal output from the ECU 26 to the control unit 27c of the variable valve timing apparatus 27 is fixed to 10% which is a predetermined value. If a command of a duty ratio 10% is given from the ECU 26 to the control unit 27c, the command is originally a command of the speed corresponding to the motor speed of 100 rpm (200 rpm in terms of engine speed).

However, since the phase of the intake cam 11 is already controlled to the physically most advanced position by the variable valve timing apparatus 27, only the motor speed corresponding to the actual engine speed at that timing can be generated in the intake cam driving motor 27b. For example, the speed of the intake cam driving motor 27b at the engine speed 100 rpm is 50 rpm. That is, in the period until the engine is completely stopped, excessive motor torque continues to be generated further in the advance direction at the most advanced position, that is, in the direction of pressing the protrusion 27i of the driven rotating body 27h against the most advanced stopper 27f of the drive rotating body 27e. Therefore, the phase of the intake cam 11 can be maintained at the most advanced position until the engine is completely stopped.

In addition, by fixing the duty ratio at the time of the low-speed control to 10%, it is possible to reduce the current or voltage applied to the circuit and each circuit component in the control unit 27c of the variable valve timing apparatus 27. Here, in a case where the duty ratio of the PWM output from the ECU 26 is not fixed to 10% and a speed command is given to the control unit 27c, excessive motor torque is generated in the intake cam driving motor 27b of the variable valve timing apparatus 27, which may cause a failure due to heating of the intake cam driving motor 27b or a failure due to heat generation of the circuit components.

In contrast, if the command of the duty ratio given from the ECU 26 to the control unit 27c is too small, the motor torque of the intake cam driving motor 27b becomes too small, and there is a concern that the protrusion 27i of the driven rotating body 27h is separated from the most advanced stopper 27f of the recess 27j of the drive rotating body 27e due to the influence of cam reaction force or the like in the rotation of the intake cam 11 interlocked with the rotation of the crankshaft 5, and the phase of the intake cam 11 is shifted to the retard side from the most advanced position. Therefore, it is necessary to switch the speed instruction using the fixed duty ratio switched at the time of engine low speed to an optimum numerical value according to the type of engine to be mounted, the width of the cam, and the lift amount of the cam. In the present embodiment, the set current and the set voltage supplied from the motor driver 27c-b to the intake cam driving motor 27b are set to 3% or more and 20% or less of the rated current of the intake cam driving motor 27b and the circuit. <<Steps S09, S10>>

At the timing when the signal from the crank angle sensor 6 to the ECU 26 is no longer input for a certain period, it is determined to be engine stop in which engine rotation is completely stopped, and output of the PWM signal at the fixed duty 10% from the ECU 26 to the control unit 27c is stopped to enter a standby state.

<Application Effect of Present Embodiment>

Since the specifications in which the duty ratio of the PWM output from the ECU 26 is switched are adopted, the phase of the intake cam 11 at the time of engine stop can be controlled to the most advanced position by the variable valve timing apparatus 27, and the phase of the intake cam 11 can be started from the most advanced position at the time of the next engine restart.

It is desired to reduce the engine speed variation and reduce noise, vibration, and harshness (NVH) at the time of engine restart by controlling the phase of the intake cam 11 to the most advanced position to set the profile of the valve timing of the intake valve 9 to the most advanced profile 9a in a period called motoring which is pre-ignition time at the time of engine restart, as described above. For this purpose, as illustrated in FIG. 9, similarly to the engine stop processing, it is necessary to increase the engine speed in a state where the phase of the intake cam 11 is controlled to the most advanced position also at the time of engine restart. Therefore, also at the time of engine restart, the control at the time of low engine speed and the normal control after the engine speed increases are switched similarly.

Figure 14:
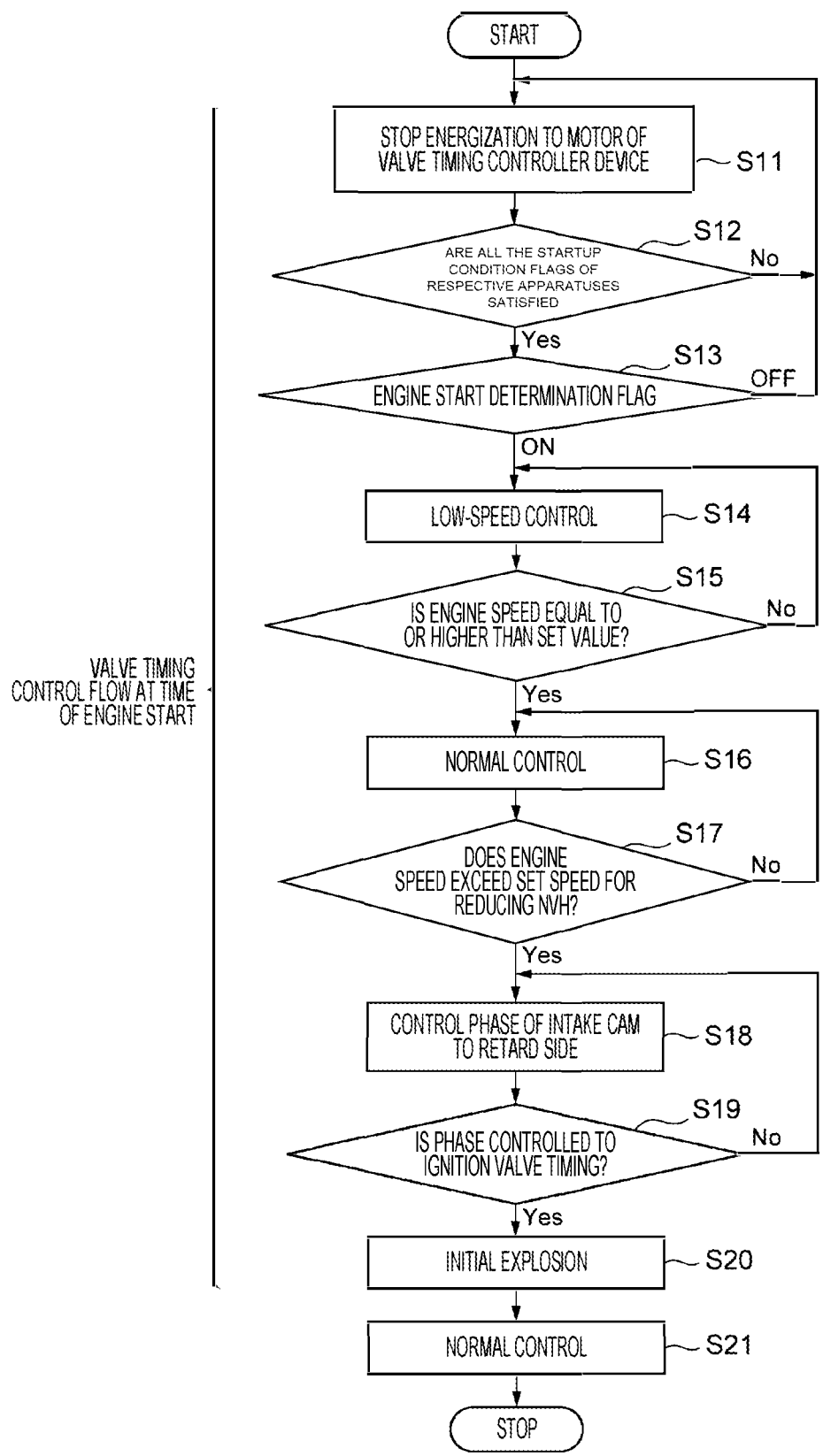
FIG. 14 is a flowchart for explaining phase control of the intake valve at the time of engine start.
Figure 15:
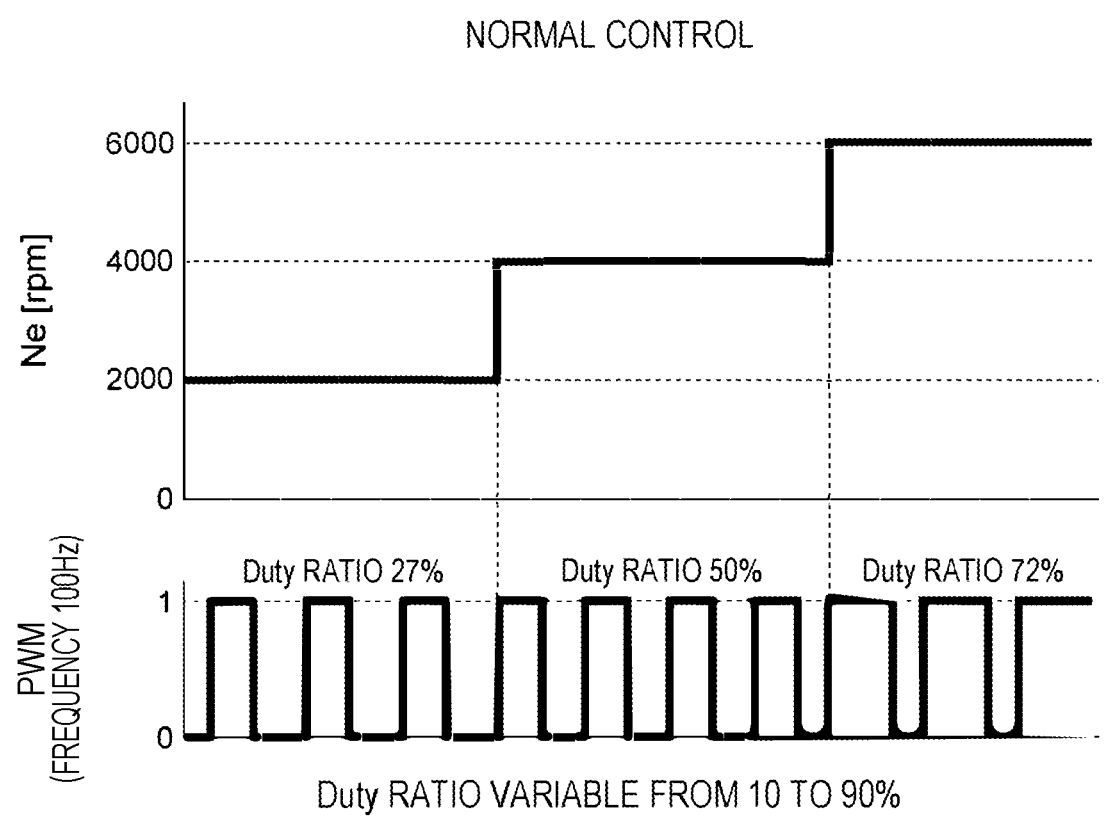
FIG. 15 is a diagram illustrating a relationship between an engine speed and a PWM signal during normal control at the time of engine start.
Figure 16:
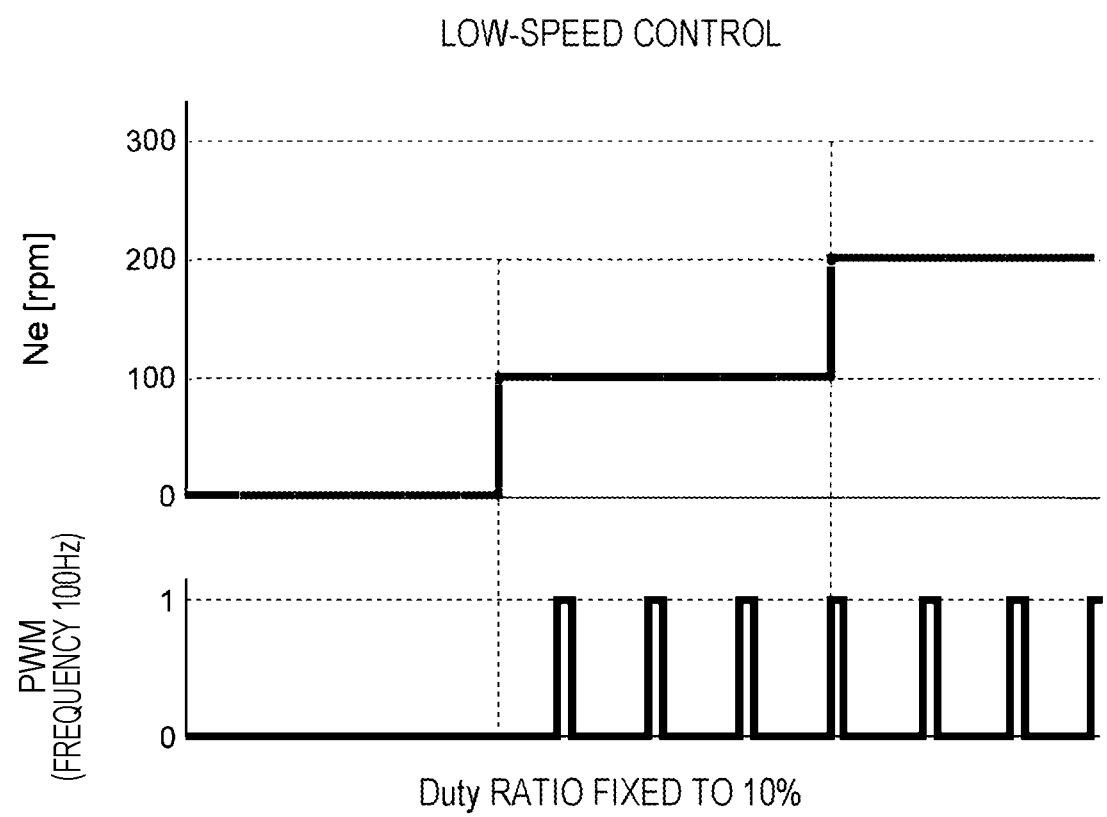
FIG. 16 is a diagram illustrating a relationship between an engine speed and a PWM signal during low-speed control at the time of engine start.

FIG. 14 is a flowchart based on the low-speed control at the time of engine restart. FIGS. 15 and 16 are conceptual diagrams of duty control at the time of engine start. FIG. 15 illustrates a state in which the duty ratio is switched in proportion to the engine speed as the normal control, and FIG. 16 illustrates a state in which a command is issued at a constant duty ratio regardless of the engine speed as the low-speed control. Hereinafter, the flowchart illustrated in FIG. 14 will be described separately for each step. In this flowchart, the start condition is engine stopping and the end condition is that the control is switched to the normal control after engine restart.

<<Steps S11, S12>>

Each device is prepared in a standby state from the previous engine stop to the next engine restart.

<<Step S13>>

When an engine start determination flag from the ECU 26 is turned on after all the startup condition flags of respective apparatuses are turned on, a rotation command is given to the control unit 27c of the variable valve timing apparatus 27, and energization to the intake cam driving motor 27b is started.

<<Steps S14, S15>>

A rotation command of pressing in the direction of the most advanced stopper 27f is given to the variable valve timing apparatus 27. The rotation command at this time provides a fixed value of a duty ratio of 10% as a rotation command in the same direction as the rotation direction of the camshaft as a low-speed control similarly in the engine stop processing. The ECU 26 receives a signal from the crank angle sensor 6 and calculates the rotational speed of the crankshaft 5. When the rotational speed of the crankshaft 5 exceeds 200 rpm, which is a second threshold, the low-speed control is terminated, and the process proceeds to step S16.

<<Step S16>>

In step S16, the low-speed control is switched to the normal control. Here, the phase of the intake cam 11 is maintained and controlled to be most advanced by the normal control in which the duty ratio in the PWM output from the ECU 26 to the control unit 27c is proportional to the engine speed.

<<Step S17>>

In order to reduce the NVH at the time of engine restart, in the present embodiment, the engine speed of 1000 rpm is set as a third threshold, and the phase of the intake cam 11 is controlled to be maintained at the most advanced position until the engine speed reaches 1000 rpm. That is, in step S17, the engine speed after switching from the low-speed control to the normal control is monitored, and the engine speed serves as a trigger for switching the phase for reducing the NVH and the phase of the initial explosion.

<<Steps S18, S19, S20>>

As described in step S17, when the engine speed exceeds 1000 rpm, which is the third threshold, the control of maintaining the intake cam 11 to the most advanced position is terminated, and the phase conversion of the intake cam 11 is started. The reason why the phase conversion is necessary is that since the phase of the intake cam 11 exists at the position (valve profile 9a) in contact with the most advanced stopper 27f, the intake compression amount is insufficient, and ignition cannot be performed as it is. Therefore, it is necessary to convert the valve timing of the intake valve to an arbitrary initial explosion valve timing position set in advance when the engine speed exceeds the third threshold of 1000 rpm (step S19). The ECU 26 confirms that the valve timing of the initial explosion has been reached, and the fuel injection signal from the ECU 26 to the injector 14 is turned on to start fuel supply to the combustion chamber for the initial explosion.

<<Step S21>>

Thereafter, until the next engine stop, the engine speed and the duty ratio are proportional to each other to switch to the normal control for driving the variable valve timing apparatus 27.

According to the above control, it is possible to reduce engine speed variation from engine stop to restart and reduce vehicle body vibration (NVH).

Second Embodiment

Applied Engine Configuration

Figure 17:
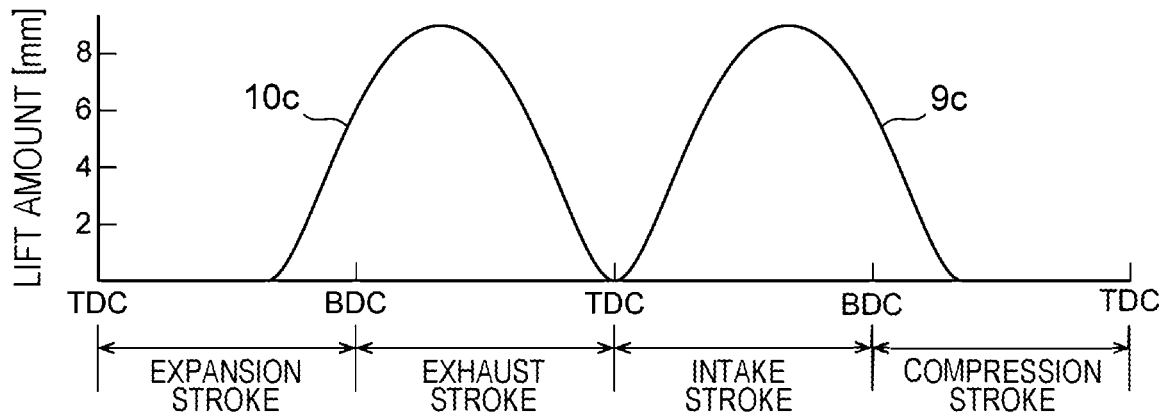
FIG. 17 is a diagram illustrating profiles of the intake cam and the exhaust cam when the intake camshaft is most advanced in a case where a late-closing Miller-cycle engine is mounted (second embodiment).
Figure 18:
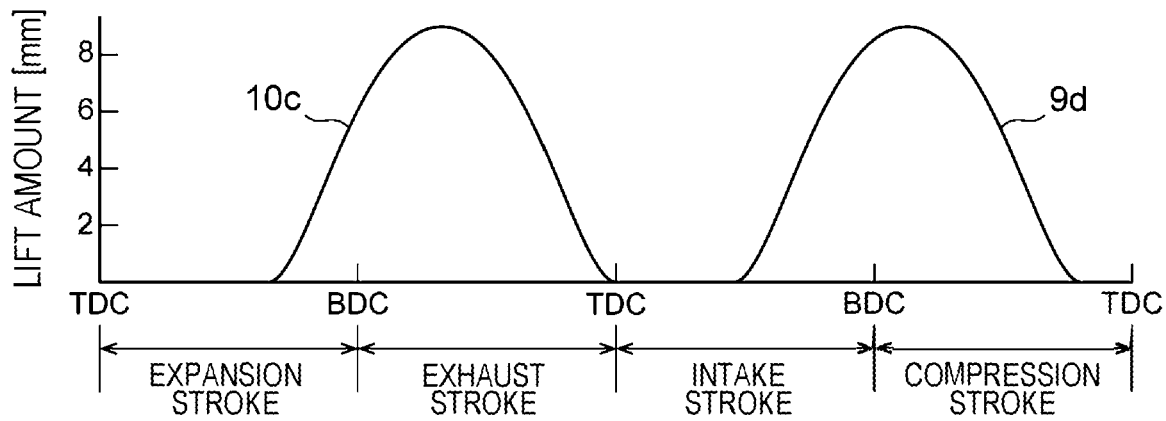
FIG. 18 is a diagram illustrating profiles of the intake cam and the exhaust cam when the intake camshaft is most retarded in a case where the late-closing Miller-cycle engine is mounted (second embodiment).

The basic configurations of the engine and its peripheral apparatuses in the present embodiment are as illustrated in FIG. 1 as in the first embodiment. The type of the engine of the present embodiment is an engine adopting a late-closing Miller-cycle. The profiles of the intake valve 9 and the exhaust valve 10 of the late-closing Miller-cycle are illustrated in FIGS. 17 and 18. FIG. 17 illustrates a profile in a case where the phase of the intake cam 11 is set to the most advanced position in the late-closing Miller-cycle engine, and FIG. 18 illustrates a profile in a case where the phase of the intake cam 11 is set to the most retarded position in the late-closing Miller-cycle engine. In the engine having a function of the late-closing Miller-cycle, a cam profile tends to have a greater cam width and a greater cam lift amount as compared with a cam of an engine having a function of an early-closing Miller-cycle.

<Control Method of Variable Valve Timing Apparatus 27>

In the late-closing Miller-cycle, it is desirable to restart the engine in a state where the phase of the intake cam 11 is controlled to the most retarded position at the time of engine restart. In contrast to the early-closing Miller-cycle, the engine equipped with a late-closing Miller-cycle has a mechanism that enables a phase in which the intake valve 9 is opened in the middle of the intake stroke and the intake valve 9 is closed after entering the compression stroke in the strokes of the four-cycle engine. Therefore, by controlling the phase of the intake cam 11 at the time of engine restart to the most retarded position, it is possible to reduce the air flow rate in the engine cylinder in the compression stroke, to reduce the rotational speed variation when the rotational speed of the crankshaft 5 increases at the time of engine restart, and to suppress vehicle body vibration (NVH) at the time of engine restart. In the present embodiment, this operation is established by phase conversion by the valve timing apparatus mounted on the intake camshaft.

In the present embodiment, by switching the control according to the engine speed, it is possible to restart the engine in a state where the phase of the intake cam 11 is controlled to the most retarded position at the time of engine restart. In order to press the protrusion 27*i* of the driven rotating body 27*h* against the most retarded stopper 27*g* during engine low-speed control in the late-closing Miller-cycle engine, it is required to control the speed of the intake cam driving motor 27*b* to reverse rotation with respect to the rotation direction of the camshaft or zero.

In the control at a low engine speed in the present embodiment, as a rotational speed command in a direction opposite to the rotation of the camshaft, a command of a frequency of 200 Hz and a duty ratio 10% of PWM output from the ECU 26 to the control unit 27*c* of the variable valve timing apparatus 27 is given. As a result, the current or voltage supplied to the motor is fixed to a current or voltage that changes the relative rotational phase of the camshaft in the retard direction at the most retarded position. Then, the phase of the intake cam 11 from the engine low-speed region at the time of engine stop until the engine has stopped can be controlled to the most retarded position while the protrusion 27*i* of the driven rotating body 27*h* is brought into contact with the most retarded stopper 27*g* in the recess 27*j* and is pressed in the most retarded stopper direction.

In the present embodiment, the engine speed of 200 rpm in a state where a fuel cut signal in the ECU 26 is turned on is defined as a control switching condition (first threshold), a region of the engine speed of 200 rpm or more is defined as a normal control region, and a region of the engine speed lower than 200 rpm is defined as a low-speed control region. After the ECU 26 determines engine stop and stops fuel supply into the cylinder by the injector 14, the engine speed is switched to the rotation by inertia, so that the engine speed, that is, the rotational speed of the crankshaft 5 gradually decreases. The ECU 26 calculates the signal of the crank angle sensor 6 as the rotational speed of the crankshaft 5, and switches the control of the valve timing apparatus from the normal control to the low-speed control (200 Hz, duty ratio fixed to 10%) when the speed becomes lower than 200 rpm as described above. By performing the control in this manner, the phase of the intake cam 11 can be controlled to the most retarded position until the engine has stopped.

<Application Effect of Present Embodiment>

On the other hand, in a case where the phase of the intake cam 11 at the time of engine stop can be controlled to be maintained at the most retarded position and thereafter, the phase of the intake cam 11 can be controlled to be at the most retarded position in this manner also when the engine is stopped, the engine can be started from the most retarded position also at the time of next engine restart. Also for control switching at the time of engine restart, the engine speed of 200 rpm is set as a threshold. In a period until the initial explosion at the time of engine restart, the ECU 26 acquires a signal from the crank angle sensor 6, calculates the engine speed, switches from the low-speed control to the normal control when the speed of 200 rpm or more is detected, and outputs a duty ratio following the engine speed as a PWM signal from the ECU 26 to the control unit 27*c* of the variable valve timing apparatus 27.

The controller device for the variable valve timing apparatus according to the present embodiment described above controls the valve timing phase to the most advanced stopper position or the most retarded stopper position during the engine stop processing and the fuel cut at the time of engine restart, continues to give a command in the stopper direction fixed to a low duty ratio to the intake cam driving motor in the low-speed region where acquisition of the engine speed is difficult, sends a variable duty command proportional to the engine speed to the motor to enable switching of the control according to the engine speed in the region where the accurate engine speed can be acquired, thereby enabling controlling of the valve timing to arbitrary valve timing at the time of engine low speed.

According to the present invention, by stopping the engine in a state where the phase of the intake cam 11 is controlled to an arbitrary position at the time of engine low speed, the intake cam 11 can be started from an arbitrary phase at the time of next engine restart, the amount of intake air into the engine cylinder can be reduced, and the engine speed variation and the vehicle body NVH at the time of engine restart can be reduced.

Present Invention 1 is a controller device applied to an internal combustion engine including a variable valve timing apparatus that changes a relative rotational phase of a camshaft with respect to a crankshaft of the internal combustion engine by adjusting a motor speed of a motor connected to the camshaft, the controller device including a controller unit that controls the variable valve timing apparatus, in which during engine stop processing of the internal combustion engine, the controller unit performs normal control of adjusting a current or a voltage supplied to the motor according to the rotational speed of the crankshaft to change the relative rotational phase of the camshaft to a most advanced position or a most retarded position when the rotational speed of the crankshaft is equal to or higher than a first threshold and low-speed control of fixing the current or the voltage supplied to the motor to be constant to maintain the relative rotational phase of the camshaft at the most advanced position or the most retarded position during a period from when the rotational speed of the crankshaft becomes lower than the first threshold to which the rotational speed becomes zero.

According to Present Invention 1, the relative rotational phase of camshaft can be maintained at the most advanced position or the most retarded position until the rotational speed of the crankshaft decreases to an arbitrary rotational speed and the internal combustion engine completely stops. Therefore, Present Invention 1 can be applied to an early-closing type Miller-cycle engine. In particular, in a state where the engine speed is unstable immediately before the engine is stopped, it is possible to prevent the relative rotational phase of the camshaft from being returned from the most advanced position to the retard side or from being returned from the most retarded position to the advance side by the friction of a cam ridge and the reaction force of a valve spring.

Present Invention 2 is the controller device according to Present Invention 1, in which in the low-speed control, the controller unit performs control of fixing the current or the voltage supplied to the motor to a current or a voltage that changes the relative rotational phase of the camshaft in an advance direction at the most advanced position or the current or the voltage that changes the relative rotational phase of the camshaft in a retard direction at the most retarded position.

According to Present Invention 2, the camshaft can be biased in the advance direction at the most advanced position, and the camshaft can be biased in the retard direction at the most retarded position. Therefore, the relative rotational phase of the camshaft can be maintained at the most advanced position or the most retarded position until the rotation of the crankshaft completely stops.

Present Invention 3 is the controller device according to Present Invention 2, in which the controller unit sets the current or the voltage of the motor fixed in the low-speed control to the same value as a current or a voltage of the motor set according to the first threshold in the normal control.

According to Present Invention 3, since the rotational speed of the crankshaft gradually decreases due to an engine stop process, the camshaft is rotated in conjunction with the crankshaft, and the rotational speed thereof gradually decreases. However, in the low-speed control, a current or a voltage set according to the first threshold is supplied to the motor. Thus, the camshaft is biased in the advance direction at the most advanced position and in the retard direction at the most retarded position. Therefore, the relative rotational phase of the camshaft can be maintained at the most advanced position or the most retarded position.

Present Invention 4 is the controller device according to Present Invention 1, in which the controller unit switches the normal control to the low-speed control on condition that fuel supply to the internal combustion engine is stopped, rotational speed of the crankshaft is lower than the first threshold, and the relative rotational phase of the camshaft is controlled to the most advanced position or the most retarded position.

According to Present Invention 4, immediately before the internal combustion engine is stopped, roughness occurs in a detection cycle due to a decrease in the speed, and signals acquired by the cam angle sensor and the crank angle sensor become extremely rough. However, it is possible to switch to the low-speed control at an appropriate timing, and it is possible to control the valve timing to an accurate phase.

Present Invention 5 is the controller device according to Present Invention 1, in which the variable valve timing apparatus includes a motor driver that supplies the current or the voltage to the motor on the basis of a PWM signal having an instruction pulse to drive the motor, and the controller unit outputs a PWM signal having a duty ratio proportional to the rotational speed of the crankshaft to the motor driver in the normal control, and outputs a PWM signal having a fixed duty ratio fixed to a constant value to the motor driver in the low-speed control.

According to Present Invention 5, when the rotational speed of the crankshaft is equal to or higher than the first threshold, the motor driver drives the motor on the basis of the PWM signal having the duty ratio proportional to the rotational speed of the crankshaft, and when the rotational speed is lower than the first threshold, the motor driver drives the motor by using the fixed duty ratio fixed to the constant value. Therefore, the relative rotational phase of the camshaft can be changed to the most advanced position or the most retarded position and maintained at the most advanced position or the most retarded position by the control of the motor using the PWM signal.

Present Invention 6 is the controller device according to Present Invention 5, in which in a case where the PWM signal having a fixed duty ratio fixed to a constant value is input from the controller unit, the motor driver supplies a current equal to or less than a set current value or a voltage equal to or less than a set voltage value to the motor.

According to Present Invention 6, it is possible to maintain the relative rotational phase of the camshaft at the most advanced position or the most retarded position by controlling the motor in the low-speed control.

Present Invention 7 is the controller device according to Present Invention 1, in which in a motoring period at the time of restart of the engine of the internal combustion engine, the controller unit performs low-speed control of fixing the current or the voltage supplied to the motor to be constant to maintain the relative rotational phase of the camshaft at the most advanced position or the most retarded position until the rotational speed of the crankshaft rises to a second threshold from zero, and normal control of adjusting the current or the voltage supplied to the motor according to the rotational speed of the crankshaft to change the relative rotational phase of the camshaft to the most advanced position or the most retarded position on condition that the rotational speed of the crankshaft exceeds the second threshold.

According to Present Invention 7, during the motoring period at the time of engine restart, the relative rotational phase of the camshaft can be maintained at the most advanced position or the most retarded position until the rotational speed of the crankshaft rises to the second threshold from zero.

Present Invention 8 is the controller device according to Present Invention 7, in which the controller unit performs control of converting the relative rotational phase of the camshaft into an initial explosion valve timing position on condition that the rotational speed of the crankshaft exceeds a third threshold greater than the second threshold.

According to Present Invention 8, it is possible to convert the relative rotational phase of the camshaft into the initial explosion valve timing position to secure an intake air compression amount and ignite air-fuel mixture in an engine cylinder.

Although the embodiment of the present invention has been described in detail above, the present invention is not limited to the above embodiment, and various design changes can be made without departing from the spirit of the present invention described in the claims. For example, the above-described embodiment is described in detail for easy understanding of the present invention, and the present invention is not necessarily limited to those having all the configurations described above. Furthermore, part of the configuration of one embodiment can be replaced with the configuration of another embodiment, and the configuration of one embodiment can be added to the configuration of another embodiment. Furthermore, it is possible to add, delete, or replace another configuration to, from, or with part of the configuration of each embodiment.

REFERENCE SIGNS LIST 1 cylinder head
2 cylinder block
3 piston
4 connecting rod
5 crankshaft
6 crank angle sensor
7 intake pipe
8 exhaust pipe
9 intake valve
10 exhaust valve
11 intake cam
12 exhaust cam
13 intake cam angle sensor
14 injector
15 spark plug
16 spark coil
17 fuel tank
18 feed pump
19 high-pressure fuel pump
20 common rail 21 fuel pressure sensor
22 three-way catalyst
23 oxygen sensor
24 temperature sensor
25 water temperature sensor
26 ECU (controller device)
27 variable valve timing apparatus
27a speed reducer
27b intake cam driving motor
27c control unit
27d camshaft sprocket
27e drive rotating body
27j drive rotating body recess
27f drive rotating body recess most advanced stopper
27g drive rotating body recess most retarded stopper
27h driven rotating body
27i driven rotating body protrusion
27c-a general-purpose IC
27c-b motor driver
9a early-closing Miller-cycle most advanced intake valve profile
9b early-closing Miller-cycle most retarded intake valve profile
10a early-closing Miller-cycle exhaust valve profile
9c late-closing Miller-cycle most advanced intake valve profile
9d late-closing Miller-cycle most retarded intake valve profile
10c late-closing Miller-cycle exhaust valve profile

The invention claimed is:

1. A controller device for a variable valve timing apparatus, the controller device applied to an internal combustion engine including the variable valve timing apparatus that changes a relative rotational phase of a camshaft with respect to a crankshaft of the internal combustion engine by adjusting a motor speed of a motor connected to the camshaft, the controller device comprising a controller unit that controls the variable valve timing apparatus,
wherein during engine stop processing of the internal combustion engine, the controller unit performs a normal control of adjusting a current or a voltage supplied to the motor according to a rotational speed of the crankshaft to change the relative rotational phase of the camshaft to a most advanced position or a most retarded position when the rotational speed of the crankshaft is equal to or higher than a first threshold, a low-speed control of fixing the current or the voltage supplied to the motor to be constant to maintain the relative rotational phase of the camshaft at the most advanced position or the most retarded position during a period from when the rotational speed of the crankshaft becomes lower than the first threshold to when the rotational speed becomes zero, and
the controller unit switches the normal control to the low-speed control on a condition that fuel supply to the internal combustion engine is stopped, the rotational speed of the crankshaft is lower than the first threshold, and the relative rotational phase of the camshaft is controlled to the most advanced position or the most retarded position.

2. The controller device for the variable valve timing apparatus according to claim 1, wherein in the low-speed control, the controller unit performs control of fixing the current or the voltage supplied to the motor to a current or a voltage that changes the relative rotational phase of the camshaft in an advance direction at the most advanced position or a current or a voltage that changes the relative rotational phase of the camshaft in a retard direction at the most retarded position.

3. The controller device for the variable valve timing apparatus according to claim 2, wherein the controller unit sets the current or the voltage of the motor fixed in the low-speed control to a same value as a current or a voltage of the motor set according to the first threshold in the normal control.

4. The controller device for the variable valve timing apparatus according to claim 1, wherein
the variable valve timing apparatus includes a motor driver that supplies the current or the voltage to the motor on a basis of a pulse width modulation (PWM) signal having an instruction pulse to drive the motor, and
the controller unit outputs a PWM signal having a duty ratio proportional to the rotational speed of the crankshaft to the motor driver in the normal control, and outputs a PWM signal having a fixed duty ratio fixed to a constant value to the motor driver in the low-speed control.

5. The controller device for the variable valve timing apparatus according to claim 4, wherein in a case where the PWM signal having the fixed duty ratio fixed to the constant value is input from the controller unit, the motor driver supplies a current equal to or less than a set current value or a voltage equal to or less than a set voltage value to the motor.

6. The controller device for the variable valve timing apparatus according to claim 1, wherein in a motoring period at a time of restart of the internal combustion engine, the controller unit performs the low-speed control of fixing the current or the voltage supplied to the motor to be constant to maintain the relative rotational phase of the camshaft at the most advanced position or the most retarded position until the rotational speed of the crankshaft rises to a second threshold from zero, and the normal control of adjusting the current or the voltage supplied to the motor according to the rotational speed of the crankshaft to change the relative rotational phase of the camshaft to the most advanced position or the most retarded position on condition that the rotational speed of the crankshaft exceeds the second threshold.

7. The controller device for the variable valve timing apparatus according to claim 6, wherein the controller unit performs control of converting the relative rotational phase of the camshaft into an initial explosion valve timing position on condition that the rotational speed of the crankshaft exceeds a third threshold greater than the second threshold.

8. A controller device for a variable valve timing apparatus, the controller device applied to an internal combustion engine including the variable valve timing apparatus that changes a relative rotational phase of a camshaft with respect to a crankshaft of the internal combustion engine by adjusting a motor speed of a motor connected to the camshaft, the controller device comprising a controller unit that controls the variable valve timing apparatus,
wherein during engine stop processing of the internal combustion engine, the controller unit performs a normal control of adjusting a current or a voltage supplied to the motor according to a rotational speed of the crankshaft to change the relative rotational phase of the camshaft to a most advanced position or a most retarded position when the rotational speed of the crankshaft is equal to or higher than a first threshold, a low-speed control of fixing the current or the voltage supplied to the motor to be constant to maintain the relative rotational phase of the camshaft at the most advanced position or the most retarded position during a period from when the rotational speed of the crankshaft becomes lower than the first threshold to when the rotational speed becomes zero, wherein the variable valve timing apparatus includes a motor driver that supplies the current or the voltage to the motor on a basis of a pulse width modulation (PWM) signal having an instruction pulse to drive the motor, and wherein the controller unit outputs a PWM signal having a duty ratio proportional to the rotational speed of the crankshaft to the motor driver in the normal control, and outputs a PWM signal having a fixed duty ratio fixed to a constant value to the motor driver in the low-speed control.

* * * * *